US007378956B2

(12) United States Patent
Nam et al.

(10) Patent No.: US 7,378,956 B2
(45) Date of Patent: May 27, 2008

(54) ULID DATA STRUCTURE, ULID-BASED LOCATION ACQUISITION METHOD AND LOCATION-BASED SERVICE SYSTEM

(75) Inventors: Kwang Woo Nam, Choongcheongbuk-Do (KR); Jong Hun Lee, Seoul (KR); Jong Hyun Park, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 81 days.

(21) Appl. No.: 10/861,936

(22) Filed: Jun. 7, 2004

(65) Prior Publication Data

US 2005/0140507 A1    Jun. 30, 2005

(30) Foreign Application Priority Data

Dec. 24, 2003    (KR) ...................... 10-2003-0096964

(51) Int. Cl.
G08B 1/08    (2006.01)
(52) U.S. Cl. .............................. 340/539.13; 340/572.4; 340/825.49; 342/357.06; 455/414.1
(58) Field of Classification Search ............. 340/572.1, 340/572.4, 539.13, 825.49, 426.19; 235/375; 701/207, 213; 455/404.2, 414.1; 342/450, 342/357.01, 357.06, 357.09, 357.13, 357.17; 707/10, 100; 709/217
See application file for complete search history.

(56) References Cited

U.S. PATENT DOCUMENTS 5,517,419 A * 5/1996 Lanckton et al. ........... 701/216

5,872,526 A * 2/1999 Tognazzini ................. 340/961

(Continued)

FOREIGN PATENT DOCUMENTS

KR    2000-00409    1/2000

(Continued)

OTHER PUBLICATIONS

Oat Systems & MIT Auto-ID Center; Technical Manual; The Object Name Service; Version 0.5 (Beta); Auto-ID Center; Published Feb. 1, 2002; pp. 1-43.

(Continued)

*Primary Examiner*—Thomas Mullen
(74) *Attorney, Agent, or Firm*—Lowe Hauptman Ham & Berner LLP

(57) ABSTRACT

The present invention relates to an LBS system in which user location information is obtained using a ULID code of RFID tags attached to various places such as a building, a store, road signs, footway and road, and various LBSs are provided based on the location information. The problems that can be caused when using a conventional GPS and a wireless network are solved. It is easy to immediately obtain location information through a tag and security of private information can be enhanced. The LBS system of the present invention of the present invention includes: a plurality of RFID tags distributed on various places, for wirelessly providing a ULID code of a location; an RFID reader for wirelessly receiving the ULID code from an adjacent RFID tag; a local ULID processor for extracting current location information through a wirelessly received ULID code; and a local LBS application for providing a user with an LBS on the basis of the extracted location information.

52 Claims, 22 Drawing Sheets

U.S. PATENT DOCUMENTS

| | | |
|---|---|---|
| 6,600,418 B2 | 7/2003 | Francis et al. |
| 2003/0057270 A1* | 3/2003 | Collen .................. 235/375 |
| 2004/0087273 A1* | 5/2004 | Perttila et al. .......... 340/572.1 |
| 2005/0006470 A1* | 1/2005 | Mrozik et al. ............. 235/385 |
| 2005/0136886 A1* | 6/2005 | Aarnio et al. ............ 455/404.2 |

FOREIGN PATENT DOCUMENTS

| | | |
|---|---|---|
| KR | 2003-64686 | 8/2003 |
| WO | WO 96/07110 | 3/1996 |

OTHER PUBLICATIONS

Daniel W. Engels; Technical Memo; The Graticule Coordinate Code; Auto-ID Center; Nov. 2000; pp. 1-8.

* cited by examiner

| | | | | |
|---|---|---|---|---|
| EPC-256 TYPE I | VERSION 8BITS | DOMAIN MANAGER 32BITS | OBJECT CLASS 56BITS | SERIAL NUMBER 192BITS |
| EPC-256 TYPE II | VERSION 8BITS | DOMAIN MANAGER 64BITS | OBJECT CLASS 56BITS | SERIAL NUMBER 128BITS |
| EPC-256 TYPE III | VERSION 8BITS | DOMAIN MANAGER 128BITS | OBJECT CLASS 56BITS | SERIAL NUMBER 64BITS |

FIG. 8

VERSION
0000000 : RESERVED
0000001 : LOCATION IN A LATITUDE AND LONGITUDE COORDINATE SYSTEM REPRESENTED IN WGC84
 (ELC TYPE 1)
0000010 : LOCATION OF TYPE 1 INCLUDING AUXILIARY INFORMATION FOR PRECISION 2-SIGMA (95 %)
 (ELC TYPE 2)
0000011 : INDIRECT LOCATION FOR REPRESENTING LOCATION THROUGH A SPACE OBJECT ID ON SPACE DATABASE
 (ELC TYPE 3)
0000100 : TYPE 3 HAVING OFFSET FOR POINTING AT SPECIFIC COORDINATES IN A SPACE OBJECT ID
 (ELC TYPE 4)

FIG. 9

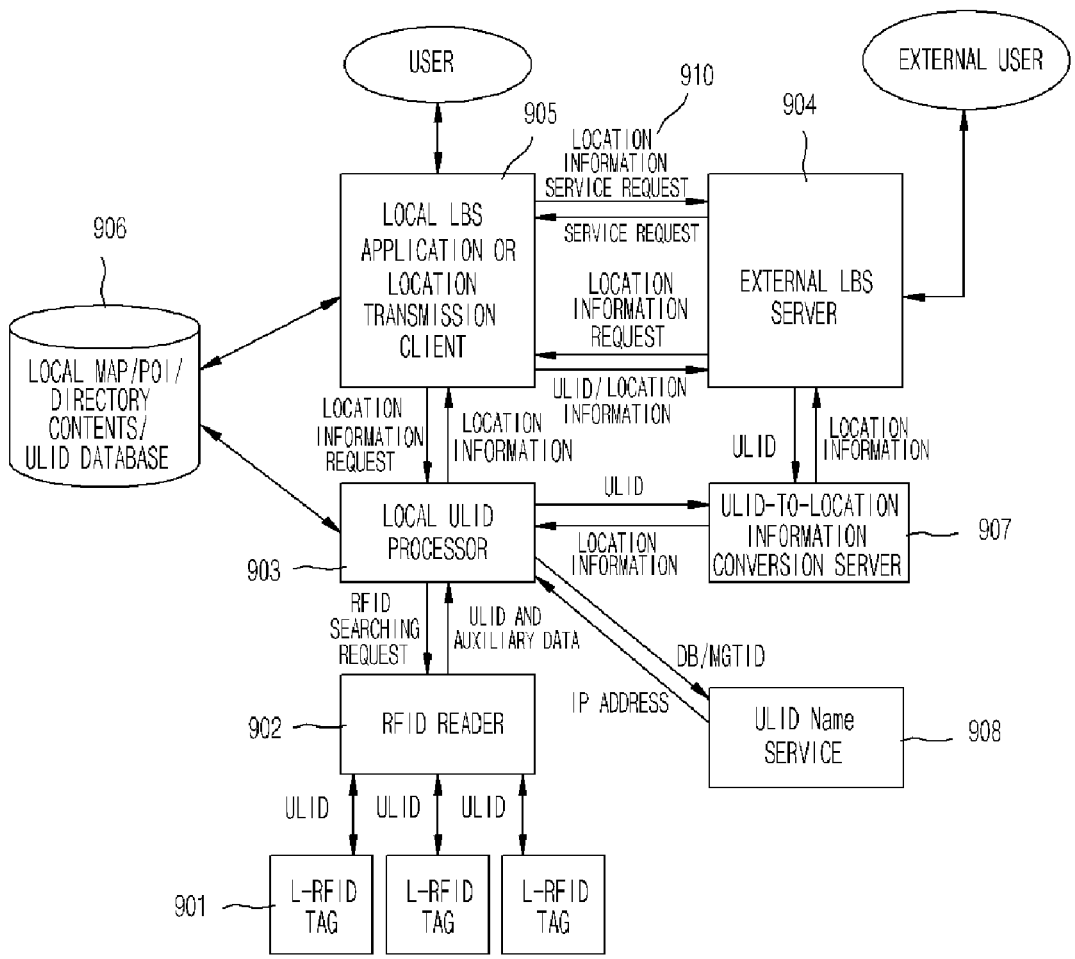

AIMLESS MODEL OF RFID READER SIGNAL

DIRECTIONALITY OF RFID READER SIGNAL

ULID NAME SERVICE AN EXAMPLE OF A ULID NAME SERVICE SERVER IP ADDRESS TABLE — 1716

129.254.115.167
129.125.113.114
68.45.4.4

AN EXAMPLE OF A DB/MGT ID CONVERSION SERVER IP MAPPING TABLE — 1717

3FFFFFFFD   129.254.115.167 //
10000000A   129.125.113.114 //
32224440A   129.125.113.114 //

ULID DATA STRUCTURE, ULID-BASED LOCATION ACQUISITION METHOD AND LOCATION-BASED SERVICE SYSTEM

BACKGROUND OF THE INVENTION

1. Field of the Invention

The present invention relates to a location acquisition and location-based service (LBS) system, and particularly, to a universal location identifier (ULID) data structure, a ULID-based location acquisition method and an LBS system, in which user location information is checked using radio frequency identification (RFID) tags attached to various buildings, stores and road signs as well as ULID received from the RFID tags, and various LBSs are provided based on the location information.

2. Description of the Related Art

Today, with the advance of wireless communication technology such as mobile communication, the LBS is expected to create a huge market in the field of wireless Internet services in the future. The LBS combines location information of a moving user or vehicle with other various information in real time and provides an additional application service necessary for the user. Location acquisition is one of the most important factors in providing the user with the LBS service.

The location information is the contents of the location of an object and the real geographical feature on the ground, which are represented using a predetermined method such as a global positioning system (GPS) in general. The GPS is an electromagnetic wave navigation system that precisely measures 3D location, speed and time of an object on the ground using satellites, which receives a satellite signal transmitted from a satellite identifying the location of the object by triangulation, measures the elapsed time of the electromagnetic wave to arrive at the system and calculates the user location. Recently, the communication systems such as CDMA and GSM employ a network system that provides location information of a mobile terminal by using the precise location of a wireless relay (or a base station). It is advantageous that the location information can be transferred to a user in a building.

FIG. 1 illustrates a typical example in which location of a hand-held telephone is acquired and the LBS is provided using the conventional mobile communication described above.

Referring to FIG. 1, a hand-held telephone 11 of a mobile communication company keeps connecting to a base station 15 for communication. The locations of the hand-held telephones connected to each base station 15 are managed by the mobile communication company. The company can provide the LBS of cell-ID level by using the location information. To acquire the more precise location information, triangulation is performed through a positioning determination entity (PDE) 12 by using signals transmitted from more than two base stations 15. The location of the hand-held telephone with a GPS module can be acquired using a signal received by a GPS satellite 16 as well as a base station signal. In some cases, the location information can be calculated by a mixed method with the base station signal. The acquired location information is transferred to an internal or external CP LBS server 14 through a location information gateway 13 of a mobile communication company. The LBS server 14 combines the acquired location information with map and directory information to provide a service through wireless Internet and wire Internet.

However, when the location information obtained using a GPS is provided to a civilian user, an error can be embedded into the location information on purpose for security. Also, the precision of the location information may deteriorate due to geographical displacement of a satellite that transmits a signal or the satellite may transmit erroneous location information due to an electromagnetic wave interface problem. The precision of the location information provided using a network system is low since it is different from a relay in their time and electromagnetic wave signals. Also, the precision may vary very much according to the location of a user. In the technologies, it is dangerous that private location information may leak through a server when the server performs a location information process to estimate location since a hand-held terminal is short of computing power as an assisted GPS.

Therefore, the technology is required, in which precise location information is extracted in a city and an interior to provide a service without any leakage of private location information.

In the present invention, an LBS is provided using an RFID so as to intend to solve the above-mentioned problem of the related arts. The basic structure of an RFID will be described in brief.

Recently, an RFID technology is applied to various industries such as electronics, dresses and foods. The RFID consisting of a miniaturized IC chip and an antenna in the fields can work as a wireless tag that can obtains the information on goods without direct contact. For this reason, the RFID is expected to substitute for the conventional optical barcode that obtains information through contact.

FIG. 2 is a block diagram of a basic structure of a system using the RFID and an RFID reader.

The RFID system is a wireless communication system consisting of an RFID reader 20 for reading and interpreting information and an RFID transponder 30 for providing the corresponding information. The RFID transponder 30 is called an RFID tag.

As widely known, the RFID systems are classified into an inductively coupled system and an electromagnetic wave system according to their connection for mutual communication, and are also classified into an active RFID and a passive RFID according to whether the RFID tag uses an additional energy source such as a battery or an external power source or not for its operation.

Most of the inductively coupled RFID tags are always operated as the passive RFID system. In other words, the IC chip in the RFID tag obtains all the energy for its operation from a reader and does not necessitate any additional power source. For this purpose, an antenna coil 25 of the RFID reader 20 generates strong electromagnetic field of high frequency around the antenna coil 25. Some of the emitted electromagnetic field generates inductive voltage in a coil antenna of a tag spaced from the RFID reader 20 to provide the tag with energy. For this reason, the passive RFID can be used semi-permanently and is small-sized but has a short transmission range. Since the active tag uses an additional energy source, a strong response signal is generated and transmitted so that the RFID signal can be detected at a long range even in the region in which transmission signal of the reader is weak. However, since the battery has a comparatively short life span, the effective life span of the tag is limited and is large-sized and expensive compared with the passive tag.

FIG. 3 illustrates a general configuration of the passive RFID. The passive RFID 30 includes an IC 31 and a coil antenna 32 in general. A capacitor 33 is selectively used to synchronize an operation frequency of the tag to a predetermined value. The IC 31 permanently stores a tag identifier and other useful information, interprets and processes a command received from the RFID reader 20, responds to the RFID reader 20, and includes software and a circuit for solve a collision caused when a multiplicity of tags assists hardware to responds to inquiry at one time. The location and characteristic of the antenna 32 are different according to the required operation frequency for an RFID portion of a tag. For example, the RFID tag of a frequency such as 2.4 GHz includes a linear dipole antenna or a folded dipole antenna while the RFID tag of a frequency such as 13.56 GHz includes a spiral antenna or a coil antenna.

The RFID includes information that can be used as an identifier in a memory 34 of the IC chip. FIG. 4A illustrates a basic structure of 96-bit electronic product code (EPC) suggested by the MIT AutoID center and its embodiment. In other words, the EPC consists of a header, an EPC manager, an object class and a serial number part.

The header identifies its version. The EPC manager is an identifier of a manufacturer that can allocate the EPC. The object class is used to specify a category such as goods that the manufacturer produces. The serial number part identifies a serial number of the goods.

FIG. 4B illustrates a structure of a location code suggested by AutoID center in the year of 2000. In the present invention, the location code is used as a reference code. The code includes an 8-bit header for identifying its version and 32-bit parts for identifying latitude, longitude and altitude respectively.

MIT AutoID center has suggested the types of the EPC code as shown in FIG. 4C but has not suggested a service method using the types of the EPC code.

SUMMARY OF THE INVENTION

Accordingly, the present invention is directed to a ULID data structure, a ULID-based location acquisition method and an LBS system, which substantially obviates one or more problems due to limitations and disadvantages of the related art.

It is an object of the present invention to provide a ULID data structure, a ULID-based location acquisition method and an LBS system, in which precise location information is extracted using RFID tags attached to various buildings, stores and road signs and ULID and also danger of information leakage is minimized so that an LBS of ubiquitous environment can be provided to a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a ULID code structure including: a header having version information for identifying a type of each of the ULID codes; and data blocks for identifying latitude, longitude and altitude of location respectively.

Preferably, the ULID code structure further includes: a data block for identifying precision of unsigned integer type so as to identify precision of corresponding location information.

According to another aspect of the present invention, a ULID code structure includes: a header having version information for identifying a type of each of the ULID codes; a DB/Mgt ID block for identifying database including space objects; a class ID block for identifying an object class or a table in the database; and a object ID block for identifying an object space in the object class or the table.

Preferably, the ULID code structure further includes: an offset value data block for identifying a specific location in a region of a corresponding space object.

According to another aspect of the present invention, a ULID-based location acquisition method includes: (a) distributing RFID tags to a plurality of places and memorizing a ULID code for the corresponding place in each RFID tag; (b) wirelessly receiving a ULID code of the RFID tag near to the current place through an RFID reader; and (c) analyzing the received ULID codes and extracting current location information.

According to another aspect of the present invention, an LBS system using ULID includes: a plurality of RFID tags distributed on various places, for wirelessly providing a ULID code of a location; an RFID reader for wirelessly receiving the ULID code from an adjacent RFID tag; a local ULID processor for extracting current location information through a wirelessly received ULID code; and a local LBS application for providing a user with an LBS on the basis of the extracted location information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings:

FIG. 8 illustrates versions of the ULID according to the present invention;

FIG. 9 illustrates a location acquisition and LBS system according to the present invention schematically;

DETAILED DESCRIPTION OF THE INVENTION

Reference will now be made in detail to the preferred embodiments of the present invention, examples of which are illustrated in the accompanying drawings.

Figure 1:
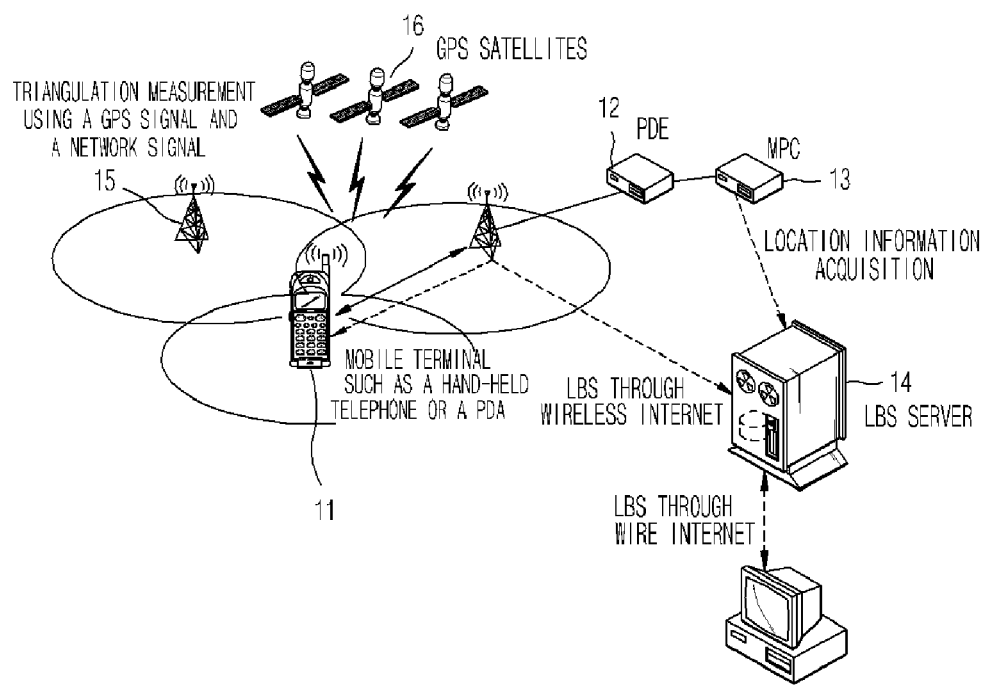
FIG. 1 is a schematic diagram of a location acquisition and LBS service in a conventional mobile communication environment.
Figure 2:
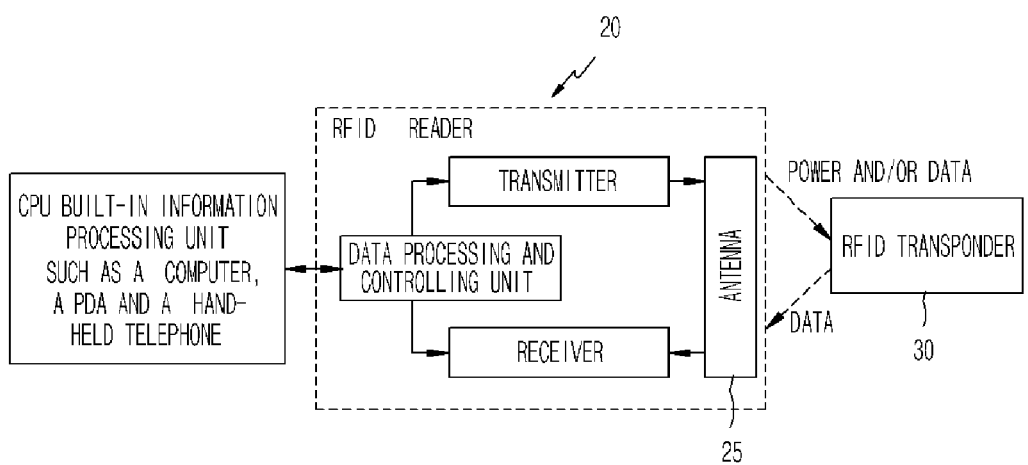
FIG. 2 is a schematic diagram of an RFID reader and tag applied to the present invention.
Figure 3:
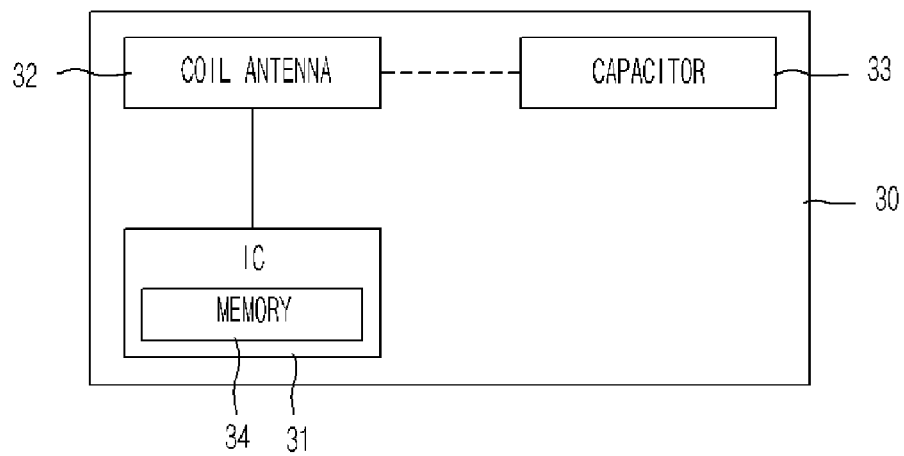
FIG. 3 illustrates an inner configuration of a passive RFID.
Figure 4A:
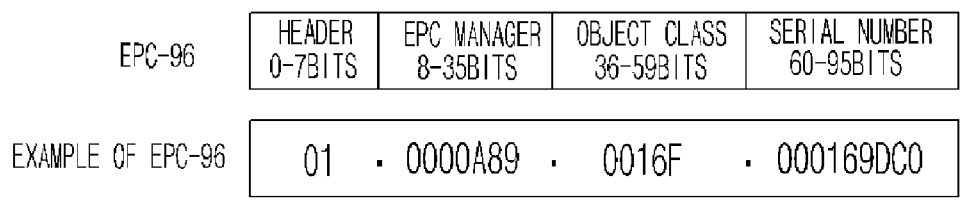
FIGS. 4A through 4C illustrate an electronics product code (EPC) and a location code suggested by MIT Auto-ID center.
Figure 4B:
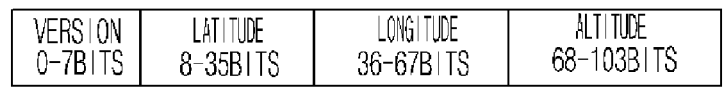
Figures 4C, 5:
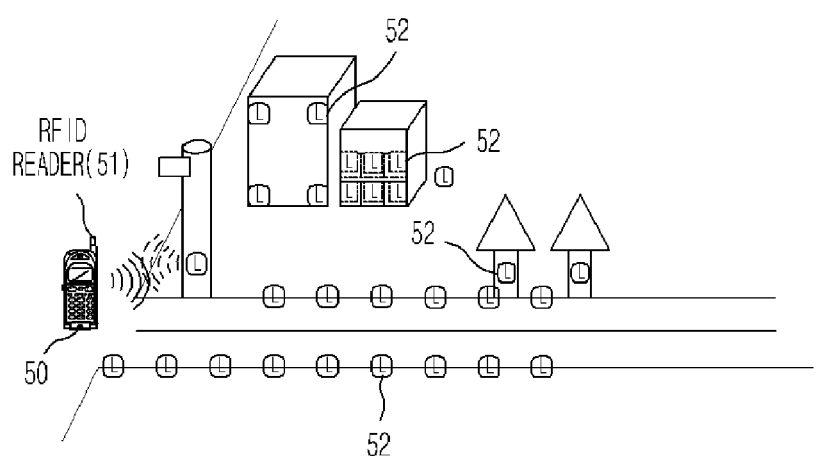
FIG. 5 illustrates a ULID-based LBS according to the present invention schematically.

FIG. 5 illustrates an embodiment in which location information is acquired from the RFID tags attached to street and by using a RFID reader combined with a hand-held telephone and an LBS service is provided.

Referring to FIG. 5, a box with a legend "L" is a location RFID tag 52 including a coordinates identifier such as WGS84 using a location code.

The location information of the RFID tag 52 is actual information of the location where the location RFID tag 52 is attached. The location information can be automatically recorded using a 4S-VAN or manually recorded by measurement.

The location RFID tag 52 can be installed any place such as a guard rail, a street tree, a signal lamp, wall of a building, a store sign, a store door and a lamp in an underground store, where the RFID tag can be fixedly attached.

The RFID reader 51 embedded in a hand-held terminal 50 such as a hand-held telephone or a PDA transmits an RFID signal and a near RFID tag 52 transmits its own location code stored in the tag in response to the RFID signal. A user searches contents stored in a hand-held terminal by using transmitted location information or transmits the location information to an LBS provider, that is, an LBS CP server to use an LBS.

Figure 6:
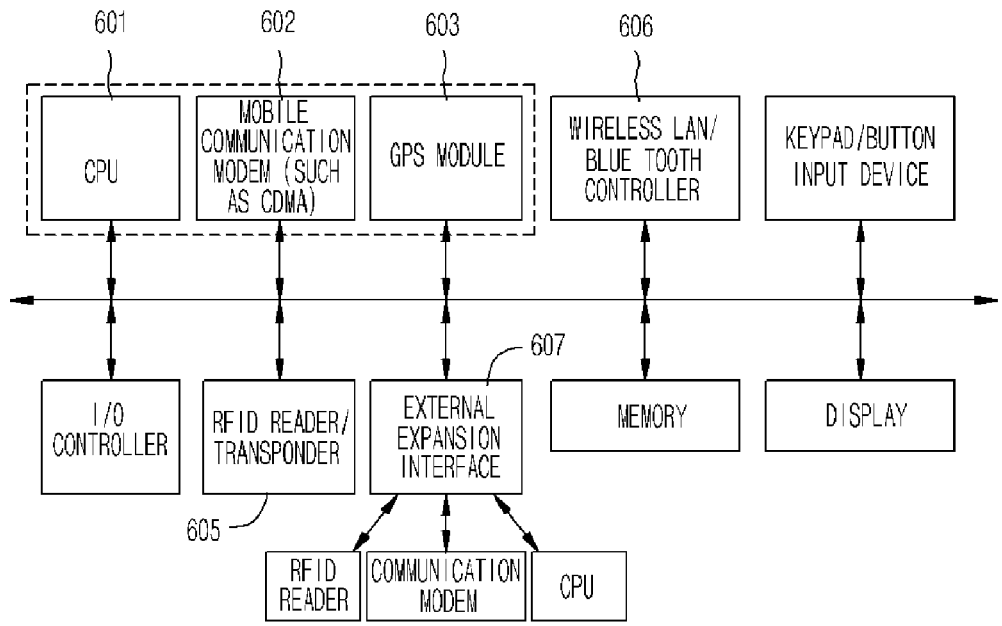
FIG. 6 illustrates a mobile terminal for a ULID-based LBS according to the present invention schematically.

FIG. 6 illustrates an embodiment of a mobile terminal to which a location acquisition and LBS method according to the present invention can be applied.

Referring to FIG. 6, the hand-held telephone includes basic components such as a CPU 601, an input device of a keypad/button, a display and a memory, which a computing system should be basically equipped with.

The hand-held terminal can be constituted as an integral system including a mobile communication modem 602 supporting mobile communication functions such as CDMA and GSM, a GPS module 603, an RFID reader 605 and a wireless LAN/Bluetooth 606. For example, the model IPaq 5450 that is a PDA of HP includes a wireless LAN/Bluetooth integrally and can expand a CDMA mobile communication modem and a GPS through a CF and SDIO external expansion interface.

The CPU 601, the mobile communication modem 602 and the GPS module 603 can be integrated into a single chip 604. For example, the model MSM 5500 of Qualcomm integrates a process core, a CDMA modem and a GPS function in one chip. When the RFID are generalized, a terminal including an RFID reader is expected to appear. Now, the RFID reader can be used though an external expansion interface 607.

Figure 7A:
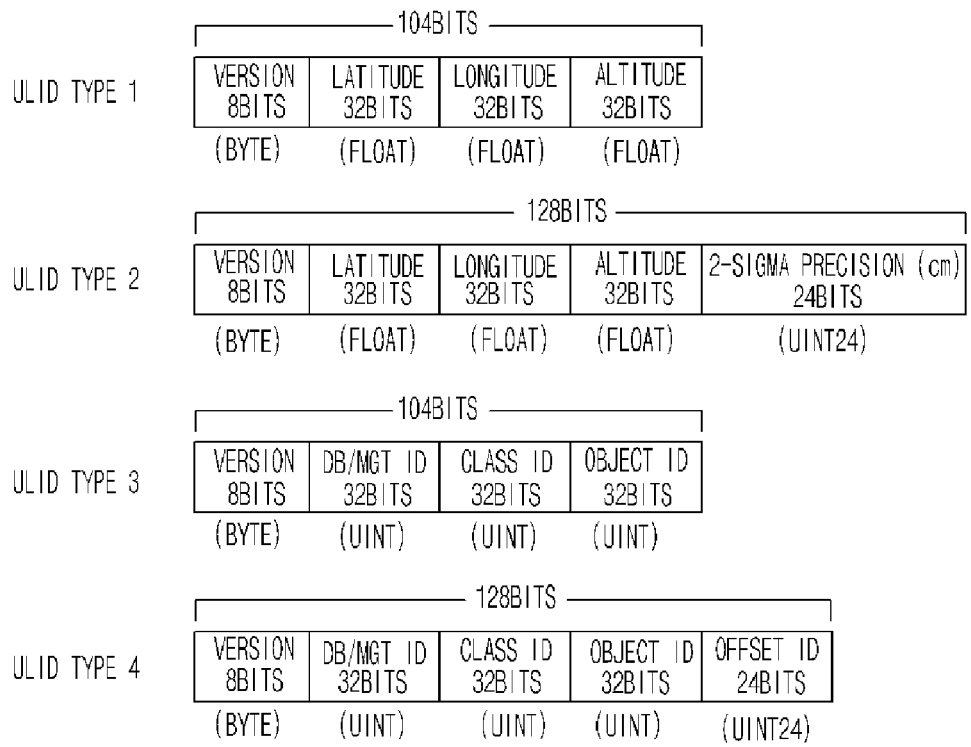
FIGS. 7A through 7D illustrate a structure of ULID and structures of extended ULID according to the present invention.

FIG. 7A illustrates an embodiment of a ULID code suggested in the present invention.

Here, the ULID is a collection of identifier code structures including various types of location identifier code. Each type of the location identifier codes is identified by a header of a leftmost 8-bit version. FIG. 8 illustrates each type represented by the version header values.

Referring to FIG. 7A, the structure of ULID type 1 includes latitude, longitude and altitude, each of which is 32-bit float type defined by IEEE754. The used coordinate system is can be selected variously due to various TMs but a WGS84 coordinate system is preferable for compatibility with a GPS.

The structure of ULID type 2 further includes a 24-bit unsigned integer type (uint24) precision part. The precision is used to represent an error rate of the method used to measure location, which is represented by the unit of cm and for which the precision of 2-sigma (95%) is used. For example, when location is obtained by a GPS having a precision of 2-sigma (95%) and 30 m, the precision part has a value (precision distance) of 3000 (=30*100 cm).

ULID type 3 represents location information not directly but indirectly by using ID of a space object stored in database. The structure of ULID type 3 includes DB/Mgt ID, Class ID and Object ID of 32-bit uint type.

Here, the DB/Mgt ID is used to identify database including space objects and can be allocated to an organization that manages each database. For example, space information database of offices in Seoul can be allocated to 3FFFFFFD, new address space database can be allocated to 3FFFFFFF, and sea space database used to manage Ministry of Maritime Affairs and Fisheries can be allocated to 4FFFFFF0. The class ID is used to identify an object class or table in database. For example, an object class of Seoul police station database can be allocated to 1000AAAA. The object ID is used to identify the object class or a space object in table. For example, some police station X of Gangnam in Seoul can be represented in the form of 33330001. They are integrally represented as follows.

03-3FFFFFFD-1000AAAA-33330001

ULID type 4 is an expanded version of ULID type 3 to represent more precise location information by offset value of space object. For example, assuming that the location information represents the police station as a polygon, the location information represented by the type 3 includes an entire police station area. Therefore, in type 4, the offset indicates a particular point in space object value constituting a polygon so that more precise location information is provided. For example, if polygon coordinates of the police station X include Polygon (Point(100, 100), Point (100, 200), Point (200, 200), Point (200, 100), Point (100, 100)) by WKB and an Offset ID is 3, ULID is represented as 04-3FFFFFFD-1000AAAA-33330001-00000003. The location indicated by the value is a single point. Point (200, 100). The location indicated by the value is a single point of Point(200, 100).

The DB/Mgt ID of the ULID types 3 and 4 is used to resolve the ULID-to-location information conversion server through the ULID name service system 908 to convert ULIDs of types 3 and 4 into actual location information. When the ULID is inputted through an RFID reader 902 and there exists one ULID-to-location information conversion server, the ULID-to-location information conversion server has only to be required for ULID conversion. However, since the ULID-to-location information conversion server 907 can be constituted by various database according to an organization/company, DB/Mgt ID is sent to the ULID name service 908 to find a corresponding conversion server for actually converting the ULID and an IP address of the conversion server for the ULID is received to request the conversion server of the IP address to perform conversion. For example, if an RFID having ULID of types 3 and 4 is installed through the space information database of the offices in Seoul, the conversion server 907 for converting the ULIDs are run and a person who obtained the ULID should register to the ULID name service system to access to the server through DB/Mgt ID.

Figure 7B:
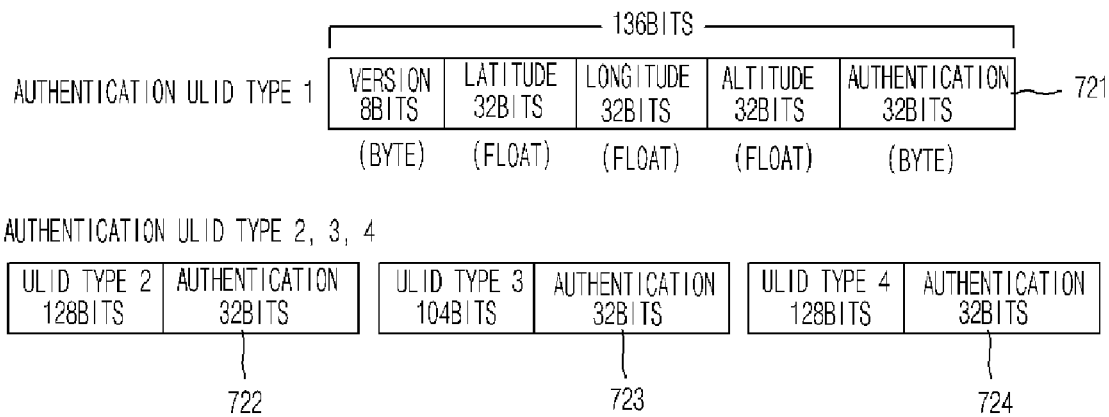
Figure 7C:
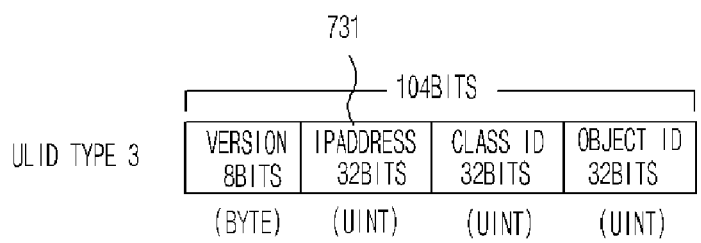

FIGS. 7B and 7C illustrate an embodiment in which expansion and modification is possible based on ULID codes of FIG. 7A.

FIG. 7B illustrates an expansion example in which 32-bit authentication codes 721, 722, 724 and 723 are added to each ULID type so that authentication is performed on an organization/person who recorded a ULID value. Here, public key-based authentication code is used to obtain reliability of the information recorded on the ULID.

FIG. 7C illustrates that the DB/Mgt ID used in ULID types 3 and 4 of FIG. 7A is replaced with an IP address 731 of a ULID-to-location information conversion server or a server for managing ULID. So, the ULID processor of a terminal that does not have its own ULID database does not connect to the ULID name service 908 but connects to the ULID-to-location information conversion server 907 to perform conversion.

Figure 7D:
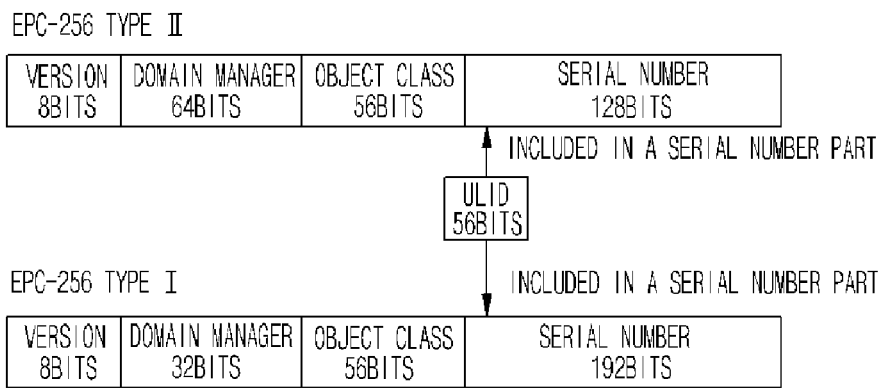

FIG. 7D illustrates a method for using 56-bit ULID with the 56-bit ULID in types 1 and 2 of EPC-256 code of MIT. So, the advantage of EPC-256 code is accepted as itself and the ULID can be used. The standard code role using domain, object and class can be used. The ULID of the present invention is designed to have the size less than 128 bits to be used in EPC-256 type 2 as well as EPC-256 type 1 supporting 192 bits.

FIG. 9 illustrates a basic embodiment of a location RFID-based LBS system according to the present invention.

Referring to FIG. 9, the LBS system includes a location RFID (L-RFID) tag 901, an RFID reader 902, a ULID processor 903, a local LBS application or location transmission client 905, local contents and ULID database 906, an external LBS server 904 and a ULID-to-location information conversion server 907.

The L-RFID tag 901 has a ULID code of FIG. 7 in a memory. The RFID reader 902 receives the ULID code from the L-RFID tag 901. The ULID processor 903 extracts optimal location information by using electronic location codes (ELCs) received from the RFID reader 902. The local LBS application or location transmission client 905 uses the location information calculated by the ULID processor 903 actually. The local contents and ULID database 906 provides LBS. The external LBS server 904 provides services externally. The ULID-to-location information conversion server 907 receives identifiers of the ULID types 3 and 4 through a network and converts the identifiers into the location information to return the location information.

Some of the components shown in a block diagram of FIG. 9 can be omitted.

For example, the LBS application and location transmission client 905 does not have to connect to a network so as to connect to an external LBS or convert the ULID when the LBS application and location transmission clients 905 connect to each other (910). In other words, even though the external LBS server 904 and the ULID-to-location information conversion server 907 are not connected to each other, the ULID types 1 and 2 can obtain the location information from their ULID. The ULID types 3 and 4 can obtain the location through the contents/ULID database stored in a local ULID database. The ULID name service 908 is used to obtain the IP address of the ULID-to-location information conversion server 907 to resolve the location information by using DB/Mgt ID of the ULID types 3 and 4. The ULID name service searches a DB/Mgt ID-IP address mapping table stored in its terminal. If the IP address to be mapped is found, the IP address is used. If the IP address to be mapped is not found, the location information is converted into an IP address through a ULID name service server.

Figure 10:
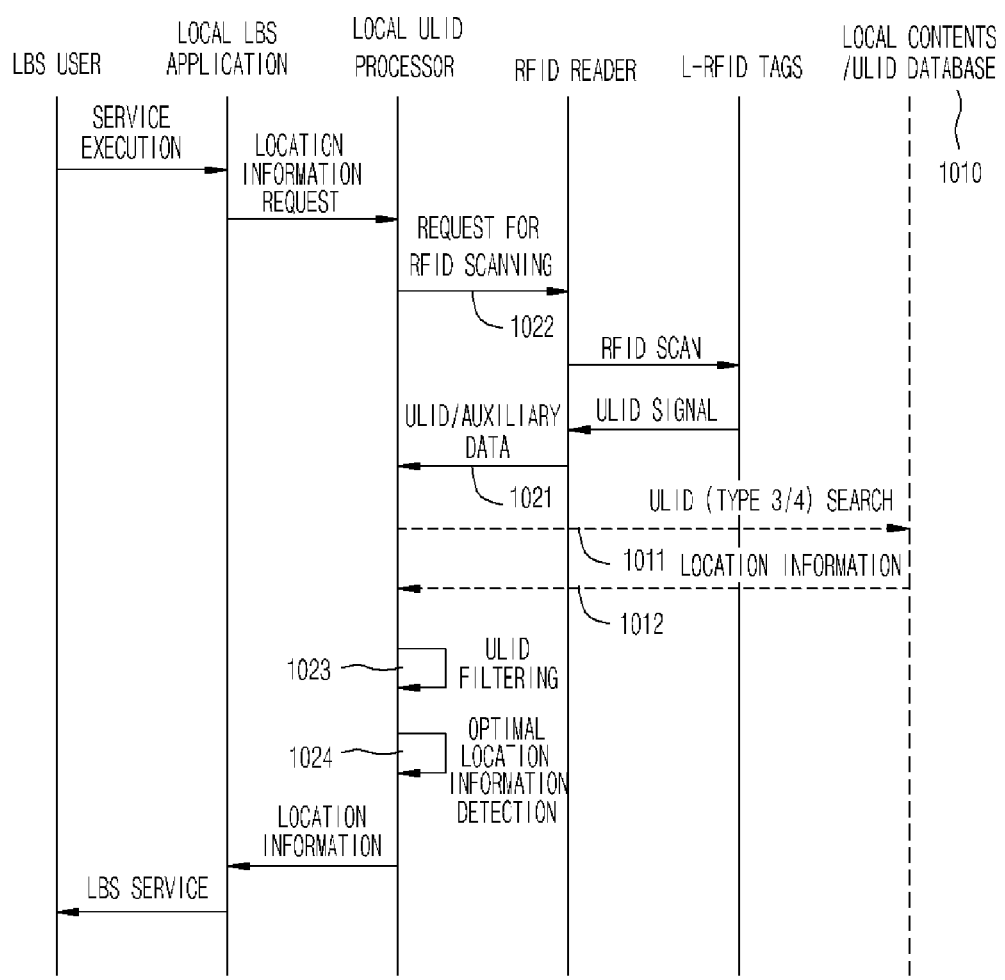
FIG. 10 illustrates a basic procedure of a ULID-based LBS service according to the present invention schematically.

FIG. 10 is a sequence diagram of an embodiment of a simplest ULID-based LBS in which a hand-held terminal without connecting to an external network obtains location information by using a local RFID reader and provides the location information.

As shown in FIG. 10, since a hand-held telephone is lack of processing capability and a memory, the local contents/ULID database 1010 is not essential. In this case, the processors 1011 and 1012 for ULID process of ULID types 3 and 4 are omitted. In FIG. 10, the portion that can be omitted is depicted by a dotted line.

Referring to FIG. 10, the local application calls a local ULID processor to obtain location information. Here, according to the necessity of application, a threshold value such as location precision can be transmitted as a parameter.

Accordingly, the local ULID processor requests the RFID reader to scan RFID (1022). The result value of the RFID reader consists of ULIDs and auxiliary data 1021 such as signal strength. The auxiliary data returned along with the ULID are used at step 1023 and an optimal location extraction step 1024 when at least one ULID is obtained by scanning once.

Figure 12:
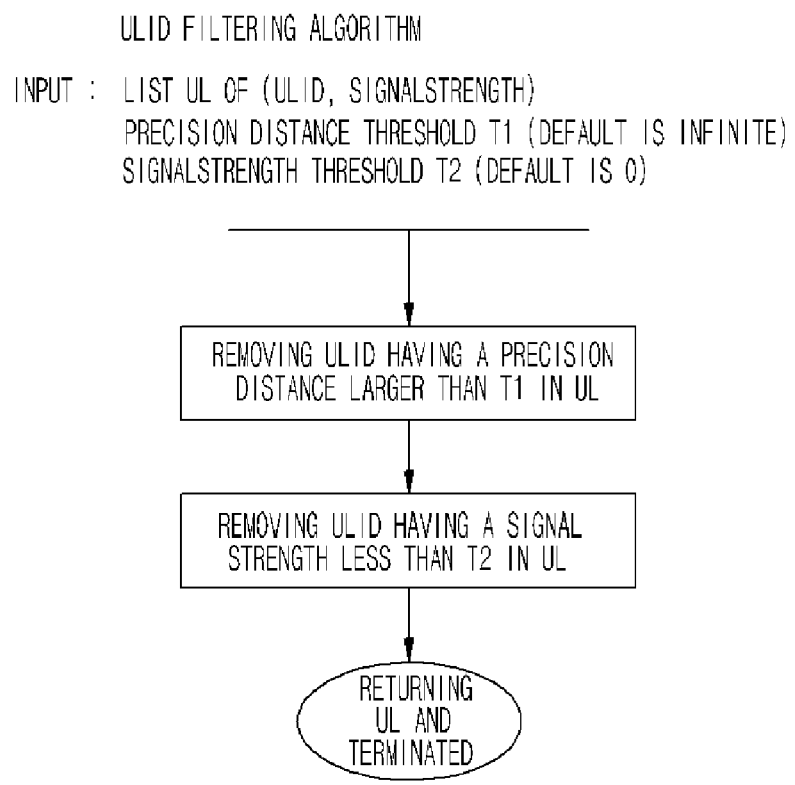
FIG. 12 is a flowchart of ULID filtration according to the present invention.

FIG. 12 illustrates an algorithm of the ULID filtration step 1023.

In the ULID filtration step 1023, a proper ULID value is selected using a threshold value and the received ULID and signal strength. Here, the threshold value transmitted by the LBS application is a location precision distance of specific level or the set of them. In this embodiment, to simplify the description, the description will be made with limitation of the precision distance of level of 2-sigma (95%).

Figure 11A:
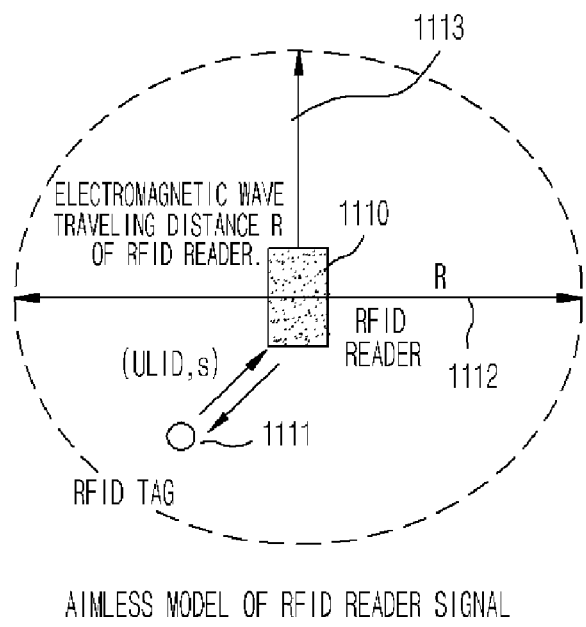
FIGS. 11A and 11B illustrate a signal model of an RFID reader for optimal location acquisition according to the present invention.

Precision radius 1112 of length R is determined by the hardware characteristic of the RFID reader. In other words, as shown in FIG. 11A, when an RFID signal is extracted by a general RFID reader, the RFID reader 1110 is not directional in general and performs available operation in a finite distance 1113 because of the characteristic of electromagnetic wave. Therefore, the effective signal traveling distance makes the least location precision distance of the location information obtained by the ULID. The RFID tags 1111 in the radius R transmit though a signal of the RFID reader. Here, the RFID reader 1110 can also obtain the signal strength received from each RFID tag as auxiliary data. Since not all RFID readers are able to obtain signal strength auxiliary data, all the signal strengths are set to have the same value when the signal strength cannot be used.

Figure 11B:
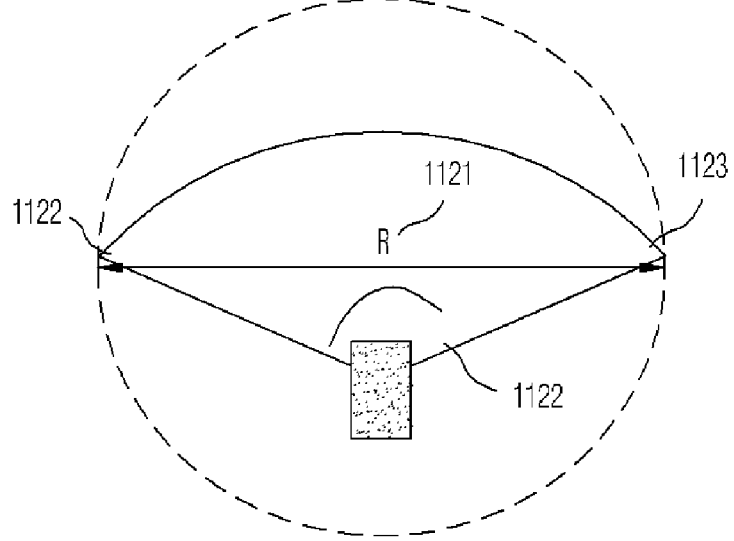

FIG. 11B illustrates a directional RFID reader or the case that ULID is obtained only within a predetermined angle due to a use environment.

For example, in case a signal can be screened by an RFID reader attached to one side of a vehicle, a wall-fixed reader or an obstacle such as a hand-held telephone and a man, it is assumed that the signal can be transmitted and received only within a predetermined angle 1122. In this case, the maximal signal traveling distance R 1121 determined by an angle can be determined as well as a signal traveling distance of the RFID. In other words, the diameter of a circle including outermost points 1122 and 1123 is determined as R in FIG. 11B.

Figure 13:
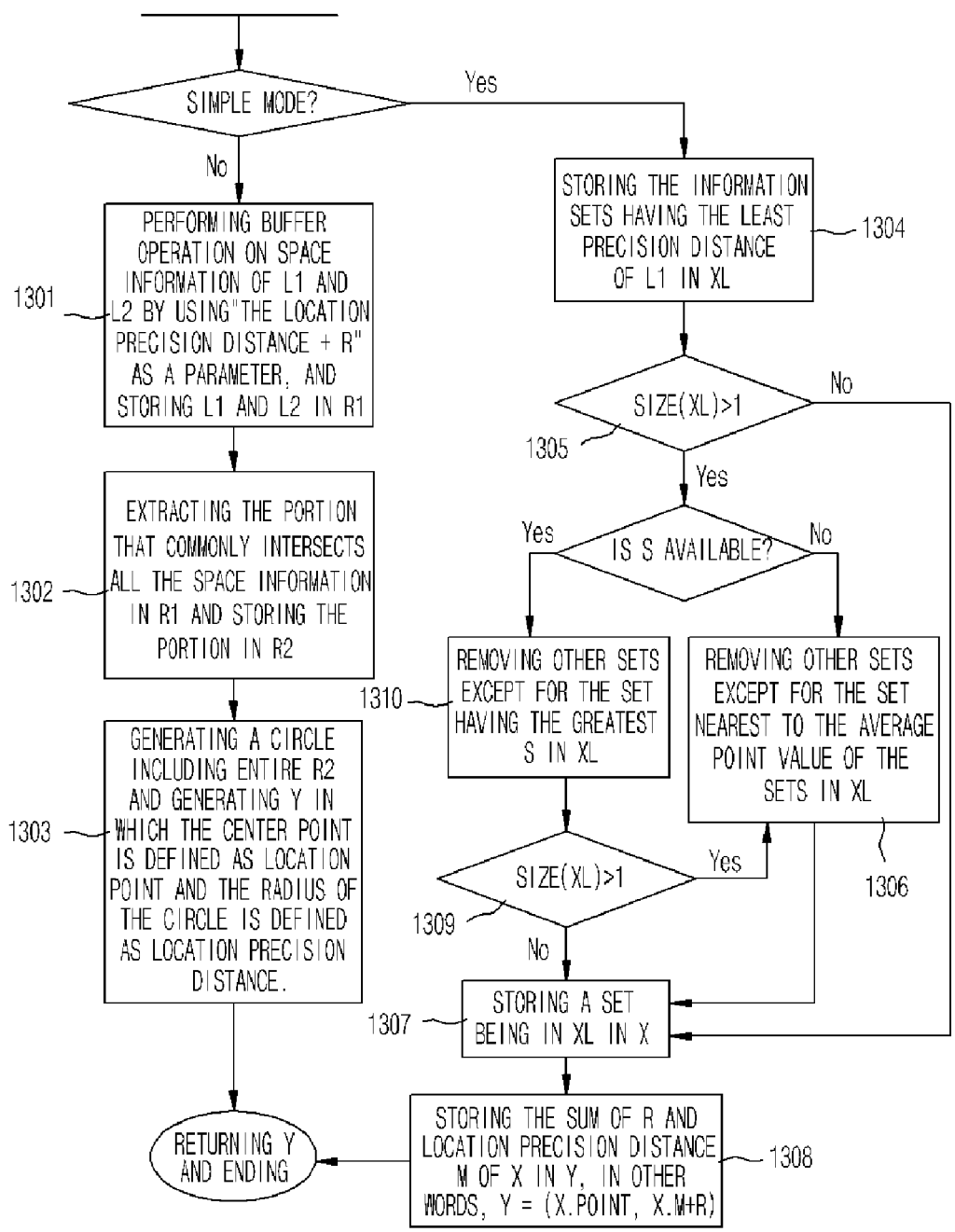
FIG. 13 is a flowchart of optimal ULID location determination according to the present invention.

On the other hand, FIG. 13 is a flowchart of the optimal location information detection step 1024.

When at least ULID is obtained, in the simplest optimal location information determination method suggested in the present invention, the ULID having the least precision distance is selected (1304), the precision distance m and the signal traveling distance r are summed, and the summing result r+m is defined as location precision distance (1305, 1306, 1307, and 1308). When some RFID L is selected, a location of the actual RFID reader has the precision distance as much as the summation of the precision distance m of L and the signal reception range r. It is the reason why the summation m+r is performed.

In FIG. 13, the algorithm in which it proceeds from the step 1304 to the steps 1305, 1307 and 1308 can be performed by itself and used independently as a simple algorithm.

In FIG. 13, the steps (1309, 1310) and (1301, 1302, 1303) are expanded to process LineString and Polygon space objects extracted by the signal strength s and ULID type 3 data respectively.

Here, the steps (1301, 1302, 1303) have ULID type 3 and more complex algorithm to extract more precise location. If location precision distance of the obtained ULIDs is too large or in order to perform more precise calculation, buffer operation is performed on each point and space objects as much as the distance m+r and each point and space objects are stored in R1 (1301). Next, the area that fully intersects all the buffer result area data in R1 is calculated and stored in R2 (1302). A circle including all the space area in R2 is generated and the center point is defined as location point. The radius of the circle is defined as location precision distance, stored in Y, and returned (1303).

Figure 14A:
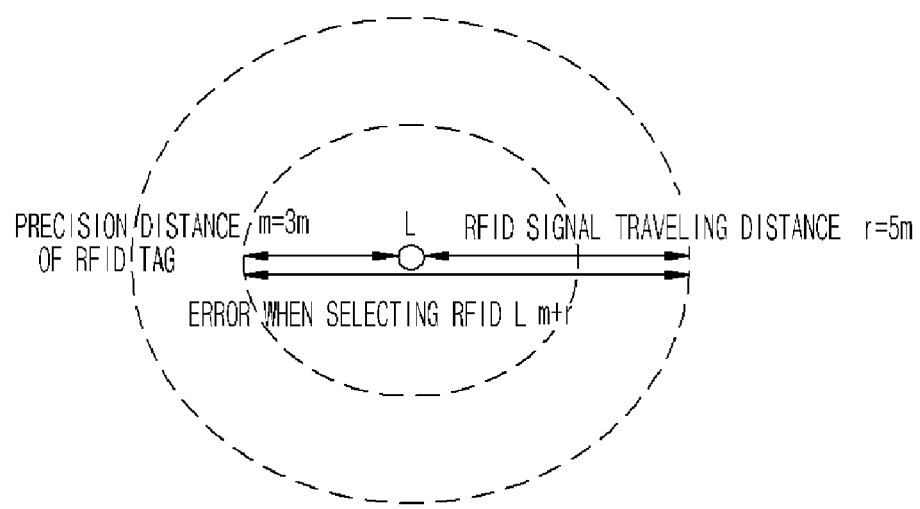
FIGS. 14A through 14D illustrate example of optimal location determination according to the present invention.
Figure 14B:
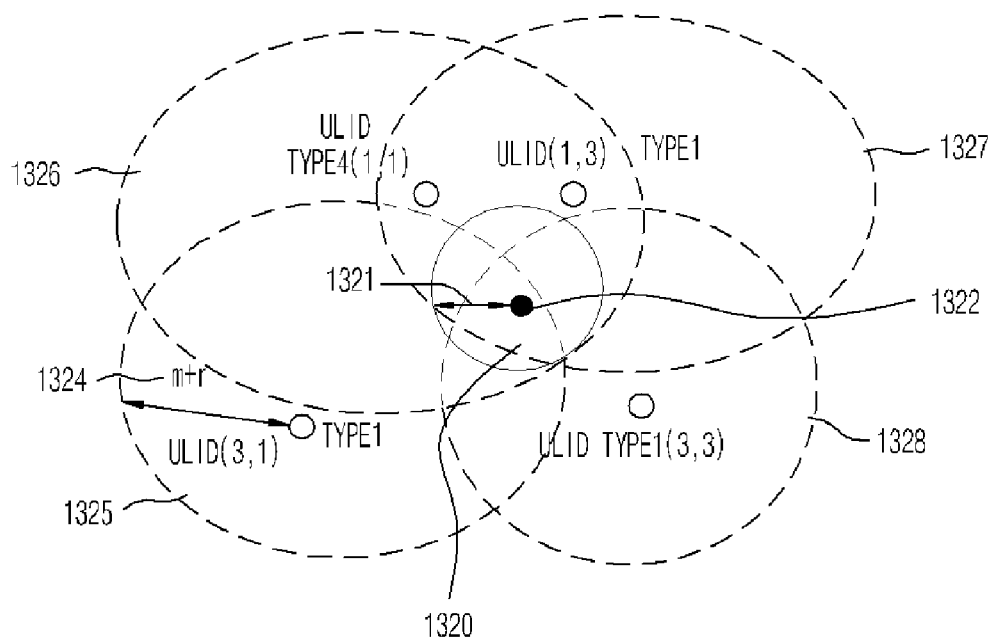
Figure 14C:
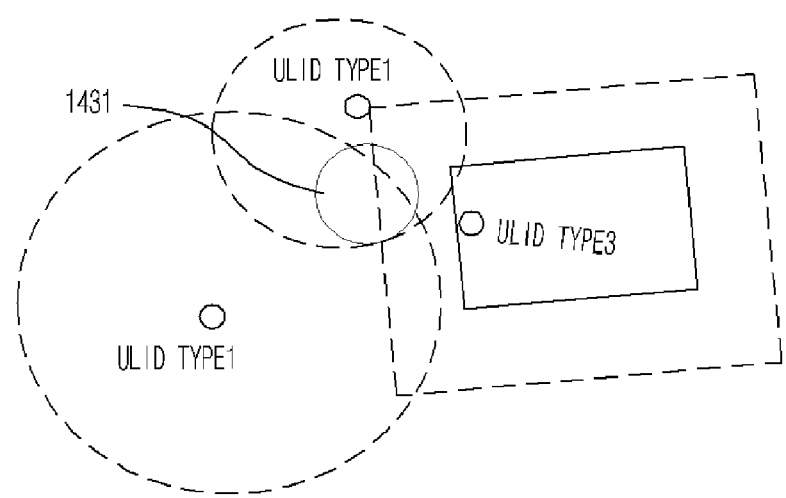

FIG. 14B illustrates the simplest example to which the steps (1301, 1302, 1303) of FIG. 13 are applied, and shows an embodiment in which the location is estimated when thee data of types 1 and 2 and one datum of type 4 are received. Each ULID data generates areas 1425, 1426, 1427 and 1428 as result of performing a buffer operation by r+m (reference numeral 1424) in the step 1301 of FIG. 13. The result 1420 of performing intersection on a buffer area is obtained as the result of the step 1302 of FIG. 13. Location information consisting of the center location 1422 and location precision distance 1421 is obtained as the result of the step 1303 of FIG. 13. FIG. 14C is illustrates a result in the presence of value of ULID type 3. The area 1431 can be obtained by the same process.

Figure 15:
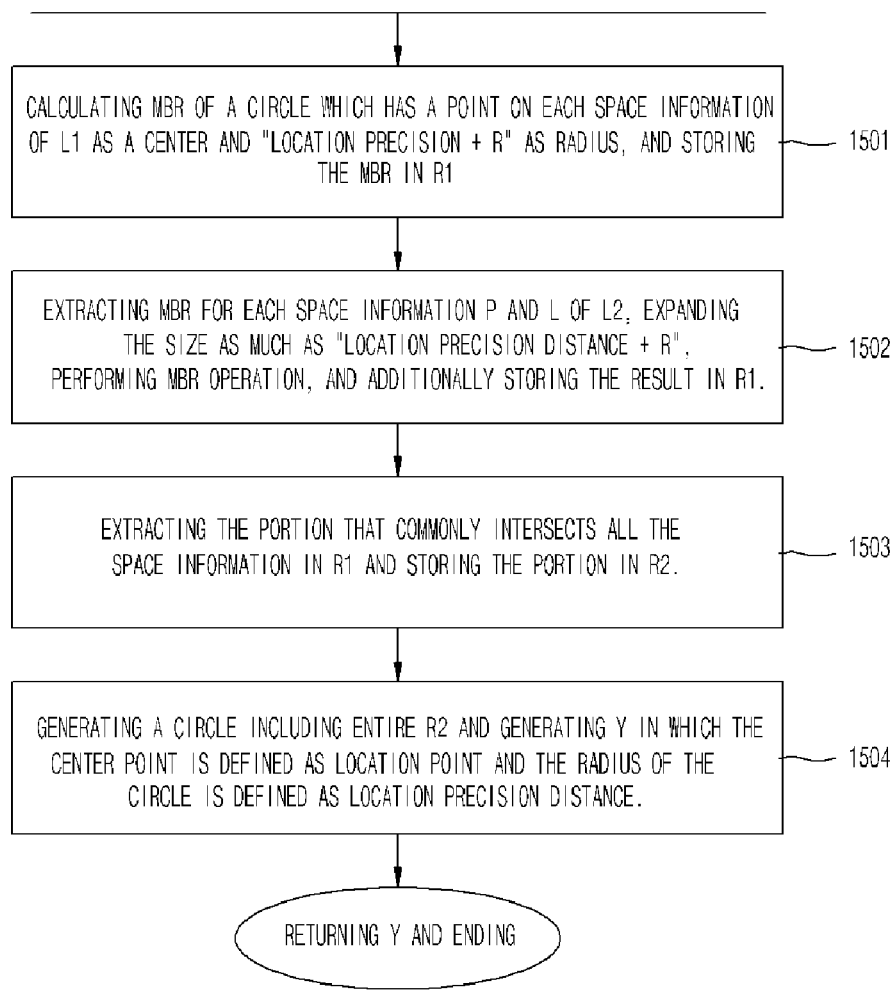
FIG. 15 is a flowchart of a fast algorithm of optimal ULID location determination according to the present invention.

On the other hand, FIG. 15 illustrates an algorithm of optimizing a process time of the steps 1301, 1302 and 1303 of FIG. 13.

To perform the steps 1301, 1302 and 1303, intersection operation is performed. This operation necessitates very long CPU process time. To solve this problem, the step 1301 of FIG. 13 uses minimum boundary rectangle (MBR) as FIG. 14D to obtain considerable efficiency. Here, since MBR includes imaginary area, the location precision distance is lengthened compared with the conventional steps 1301, 1302 and 1303.

Detailed description is made on the algorithm of FIG. 15. MBR is generated on all the location information in L1 extracted by ULID types 1 and 2, and then is stored in R1 (1501). In other words, the summation m+r is performed on ULID type 1 (3, 1) of FIG. 14D to obtain a circle 1442. MBR operation is performed on this circle to obtain a rectangle 1443 and the rectangle 1443 is stored in R1.

In the second step of the algorithm, MBR is generated to be stored in R1 additionally (1502). In other words, MBR operation is performed on polygon 1445 of FIG. 14D to obtain a rectangle 1446. This MBR is expanded as much as m+r to obtain a rectangle 1447 and the rectangle 1447 is stored in R2.

Figure 14D:
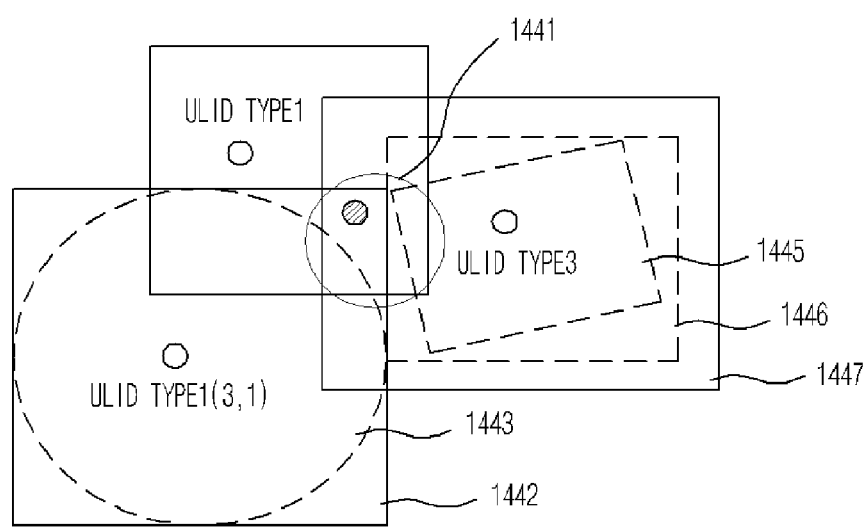

The steps 1503 and 1504 except for the steps 1501 and 1502 are the same as the algorithm 1302 and 1303 of FIG. 13. In other words, the circle 1441 including an overlap area obtained as the result of the intersection operation of FIG. 14D is calculated. The center of the circle is defined the location and the radius is defined as location precision distance.

Figure 16:
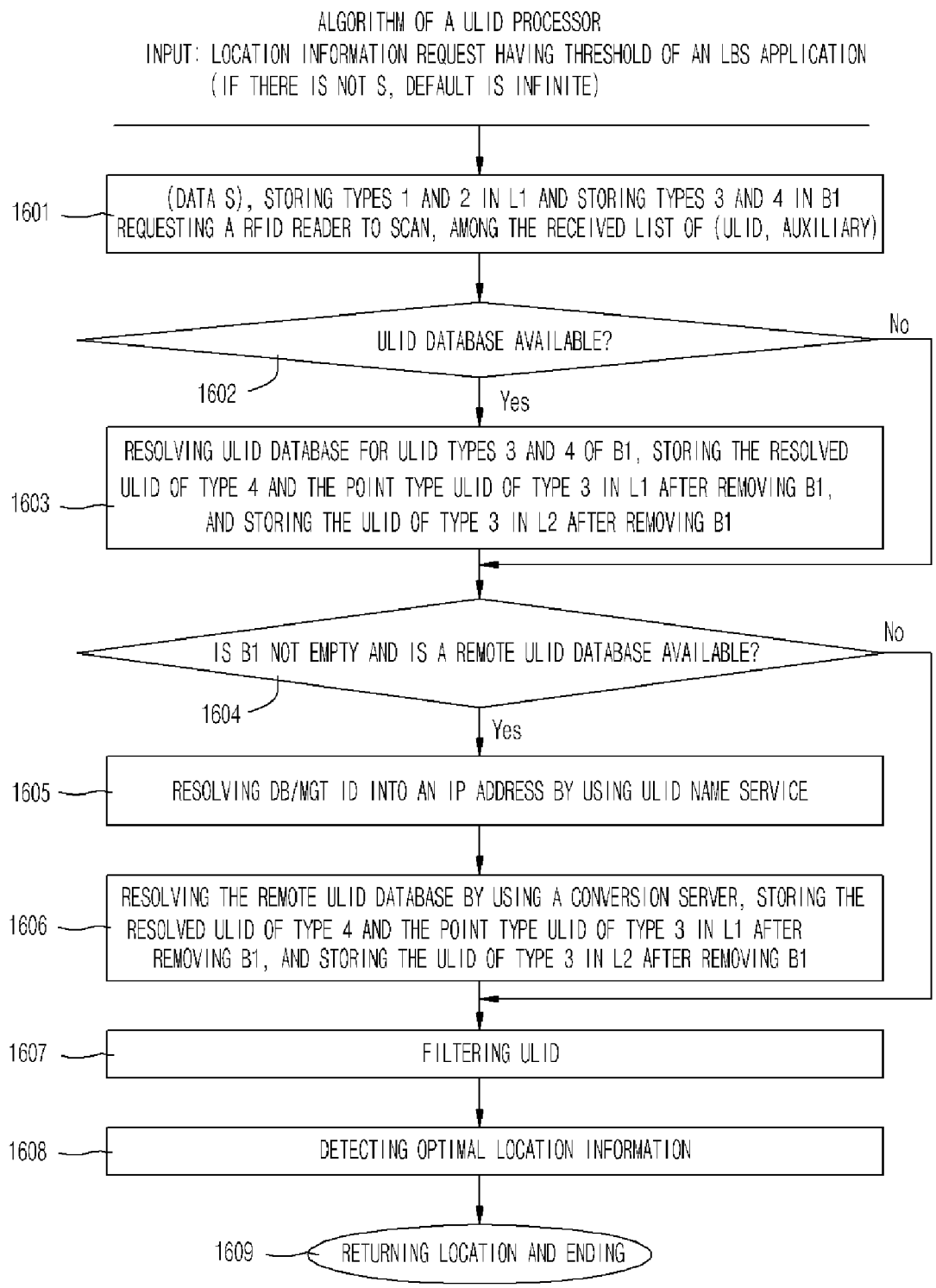
FIG. 16 is a flowchart of operation of a ULID processor according to the present invention.

FIG. 16 is an algorithm of a ULID processor.

The ULID processor obtains the ULID through the RFID reader at the request of the LBS application for location information and calculates location information. The ULID processor classifies the ULIDs received through the RFID reader into ULID types 1, 2, 3 and 4 at the request of the LBS application, and stores the ULID types 1, 2, 3 and 4 in temporary storages L1 and B1 of local database 906 (1601).

Next, if the ULID database exists in the local database 906 and the ULID database is available (1602), the ULIDs of types 3 and 4 are resolved into actual location data by using the ULID database (1603). Here, since the resolved ULID of type 4 is point data, the ULID of type 4 is stored in L1 and removed from conventional B1. The LineString data and Polygon data of ULID of the resolved type 3 are stored in L2 and removed from the conventional B1.

Next, in the next step, ULIDs to be resolved in B1 remains. If remote ULID database is available 1604, the DB/Mgt ID is resolved into an IP address of a remote ULID-location information conversion server through ULID name service 908 (1605). The data resolved remotely through the remote ULID-location information conversion server 907 are stored in L1 and L2 according to each data type (1606).

The next step is a filtration step 1607 to remove noise data and unnecessary data. Its algorithm is as shown in FIG. 12. The optimal location information extraction operation is performed on the filtered data (1608) and the location information is returned and terminated (1609). The detail algorithm of the optimal location information extraction is as illustrated in FIG. 13.

In the algorithm of FIG. 16, the steps 1602, 1603, 1604 and 1605 can be selectively omitted from the algorithm and performed since the hand-held terminal is lack of a memory and network connection. The compact algorithm can be usefully used in the hand-held telephone. In the algorithm of FIG. 16, when the values with which the LBS application satisfies threshold T is found in the steps 1601, 1603, 1605 and 1607, the steps are terminated immediately and there can exist the part which the location value is returned.

Figures 17A, 17B:
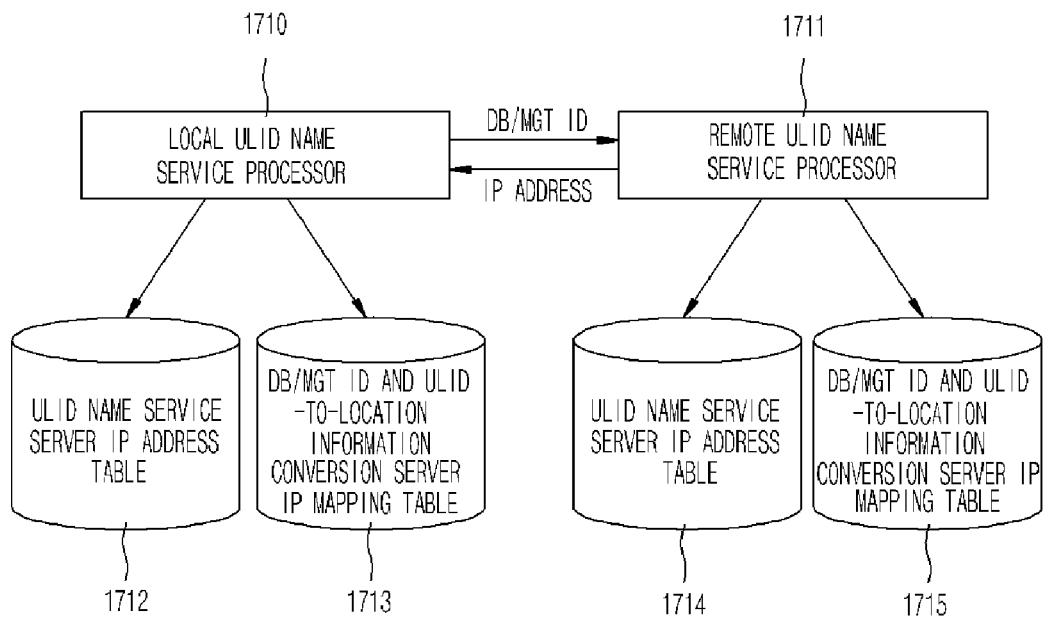
FIGS. 17A and 17B illustrate a ULID name service according to the present invention.

On the other hand, FIG. 17A illustrates an embodiment of a ULID name service used in the step 1605 to resolve DB/Mgt ID in the algorithm FIG. 16.

ULID name service is provided by a local ULID name service processor 1710 and a remote ULID name service server 1711. Each a processor and a server has an IP address table 1712 and 1714 of ULID name service server, DB/Mgt ID and ULID-to-location information server mapping table 1713 and 1715.

In hand-held telephone, when the local ULID service processor 1710 is requested to provide ULID name service, the local ULID service processor 1710 searches local DB/Mgt ID-conversion mapping table 1713. If local mapping is not possible, the local ULID service processor 1710 searches IP address table 1712 of the ULID name service server, requests the server of the highest IP address to resolve DB/Mgt ID, and waits for a response during a predetermined time t. Here, if the server of the highest IP address is not in an operation state or the local ULID service processor 1710 does not receive the response in time t, the local ULID service processor 1710 tries to requests the servers of the next IP address. When the remote ULID name server is requested to resolve, the remote ULID name server searches its own mapping table 1715 and resolve. If it is not completed to resolve in the mapping table, the remote ULID name server requests another server in its own server IP address table 1714 to resolve.

FIG. 17B illustrates an example 1716 of a ULID name service (UNS) server IP table ULID name service and an example 1717 of DB/Mgt ID conversion server IP mapping table. As shown FIG. 17B, the UNS server IP address table consists of an IP address list. The IP mapping table consists of a list of mapping information including a pair of a DB/Mgt ID and an IP address.

Figure 18:
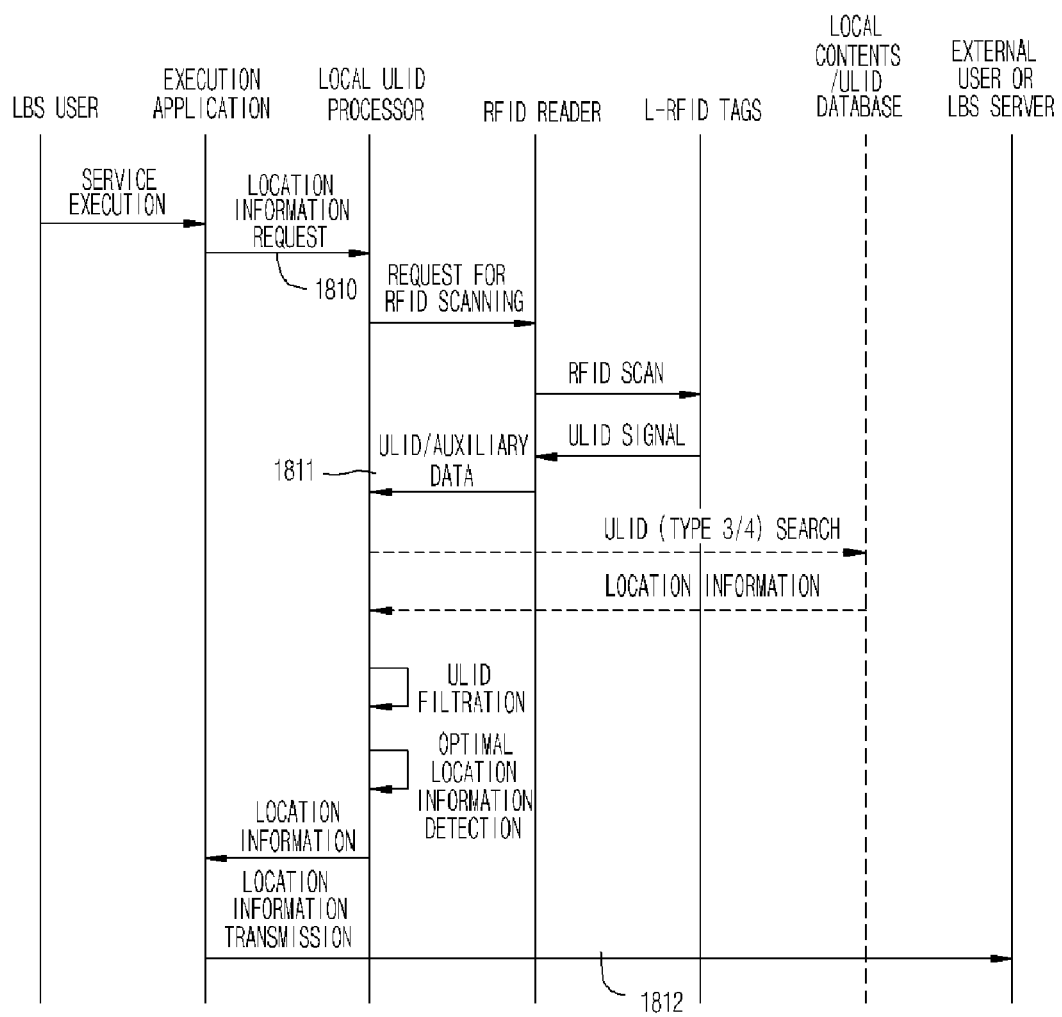
FIG. 18 illustrates a procedure of a self-location informing service using ULID according to the present invention.

On the other hand, FIG. 18 illustrates a procedure of a self-location informing service using ULID.

In FIG. 18, if an LBS terminal user executes self-location informing service of a terminal, a local application requests a local ULID processor to provide location information (1810). The ULID processor obtains location information according to algorithm of FIG. 16 (1811), and returns the location information to an informing service application. The LBS application transmits the location information to an external user or an LBS service server (1812) to inform the location of the user.

Figure 19:
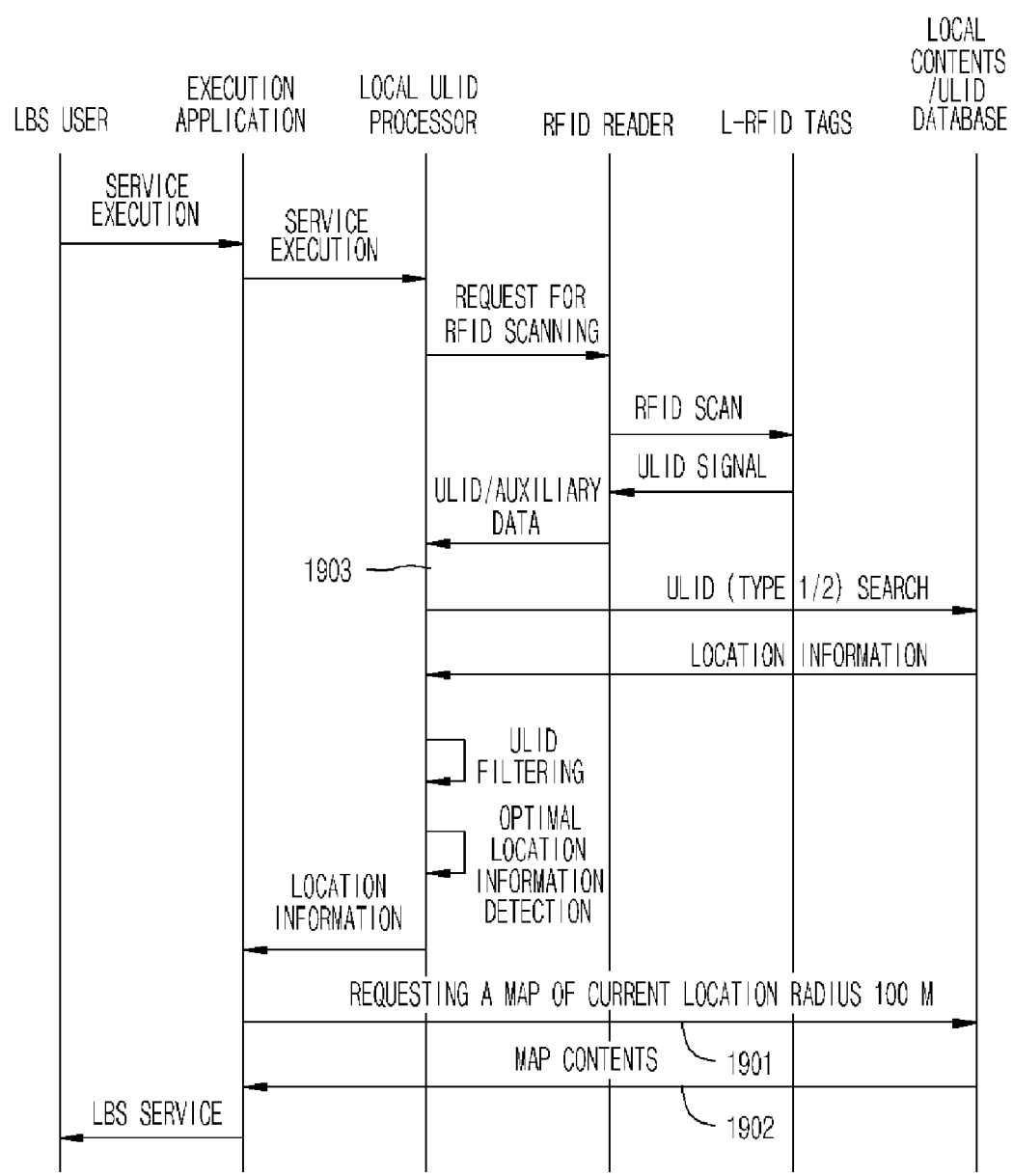
FIG. 19 illustrates a procedure of a map contents service according to the present invention.

FIG. 19 illustrates a procedure of a service in which a user searches a map in the vicinity of the current location by using map contents database in a terminal through only ULIDS of ULID types 1 and 2. In FIG. 19, the ULID processor calculates location information by using its own database at the request of the user for a map service (1903). The user requests that the ULID processor search map contents (1901). Database finds proper map contents and returns the proper map contents (1902).

Figure 20:
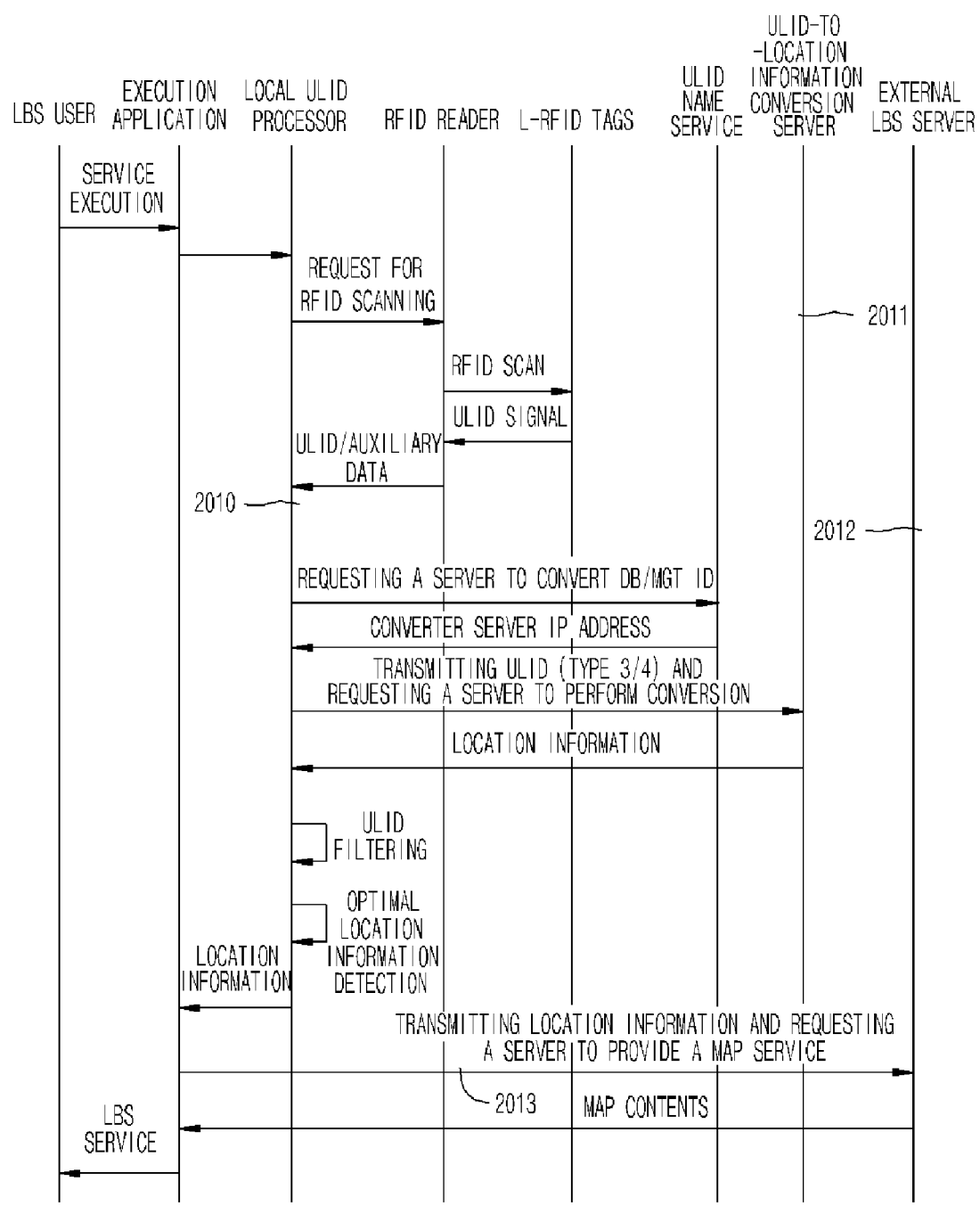
FIG. 20 illustrates a procedure of an LBS service using a network according to the present invention.

FIG. 20 illustrates a procedure in which a user collects all information of ULID types 1, 2, 3 and 4 through a terminal connected to a network, calculates location information, and requests an external LBS server to provide map contents.

In this case, similar to FIG. 19, the local ULID processor calculates location information (2010), and uses ULID name service and external ULID location information conversion server through a network (2011). The local ULID processor receives map contents through external LBS server 2012 by using the obtained location information (2013).

Figure 21A:
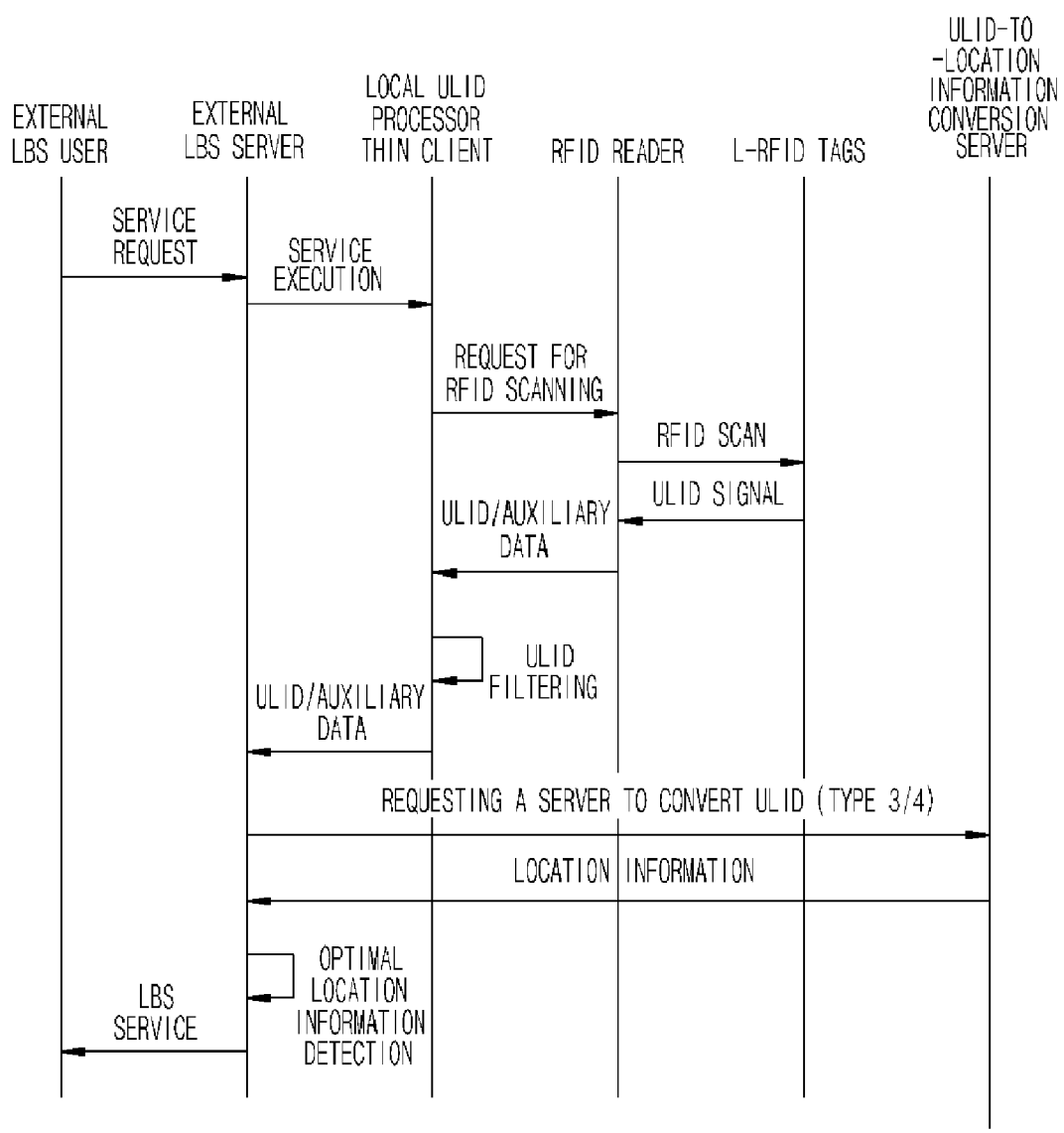
FIGS. 21A and 21B illustrate two different modes of a service in which an external user requests an external LBS server to provide a terminal user location according to the present invention.
Figure 21B:
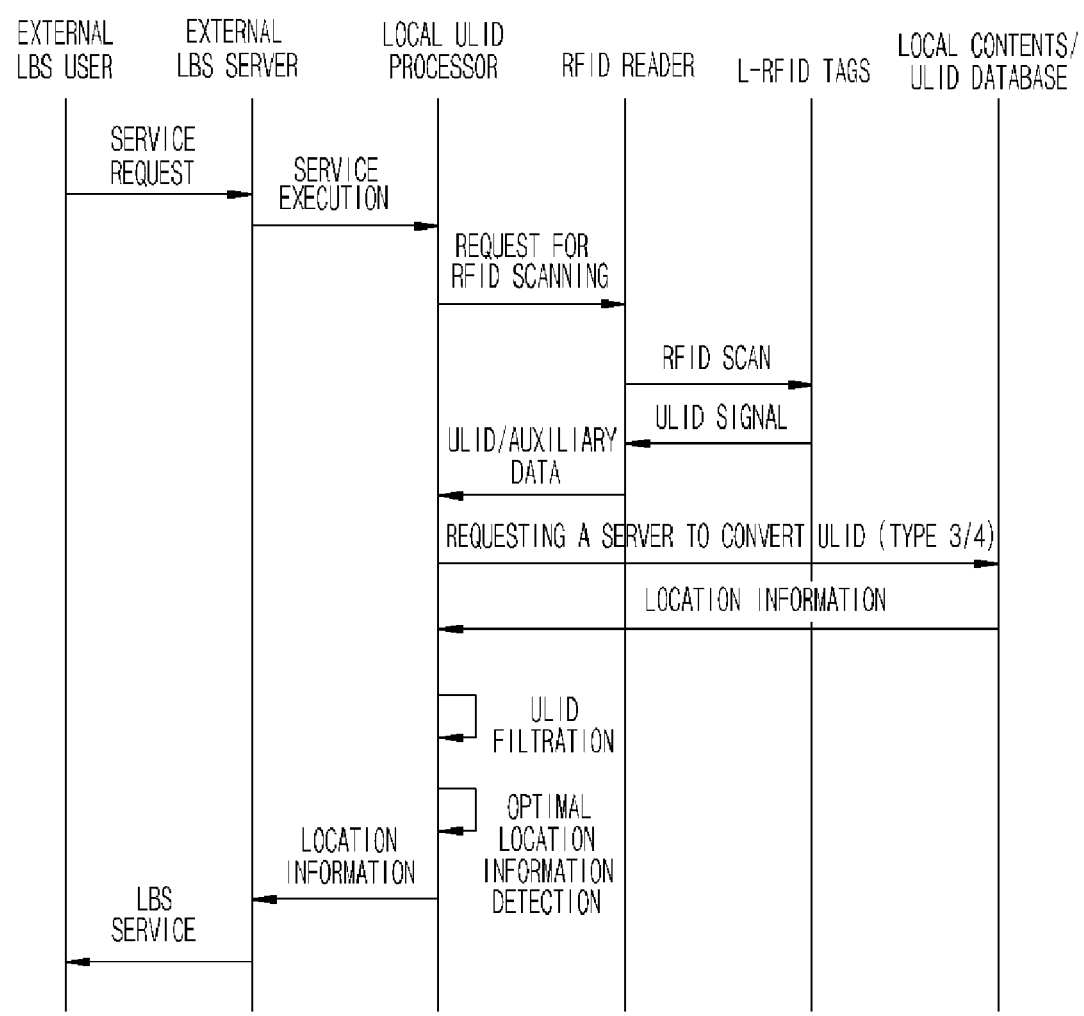

FIGS. 21A and 21B illustrate a procedure of two different modes of a service in which an external user requests an external LBS server to provide a terminal user location.

As the simplest service, there is a friend finding service provided by the conventional mobile communication companies as an example. In other words, a user who uses Internet uses a service provided by the external LBS server to find the location of a hand-held terminal user.

Figure 22:
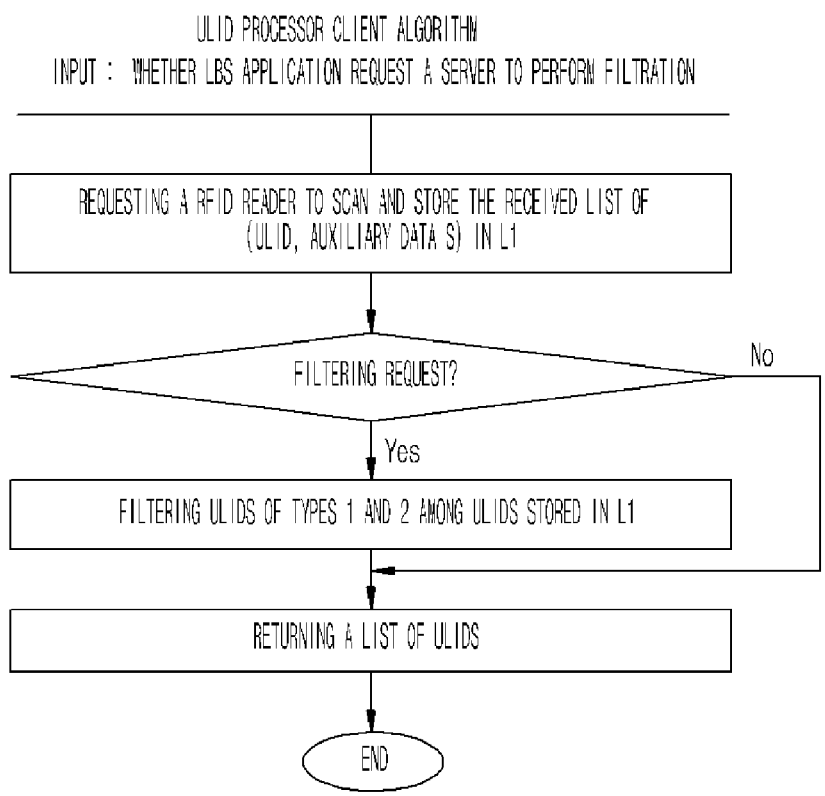
FIG. 22 is a flowchart of operation of a ULID processor client according to the present invention.

FIG. 21A illustrates a procedure of performing the service which is a method of receiving only scanned RFID information by using the algorithm of the ULID process of FIG. 22 to reduce operation load of the hand-held terminal as much as possible, and calculating the optimal location at the LBS server. In other words, location information can be processed more rapidly using an algorithm of FIG. 22.

FIG. 21B illustrates a procedure in which a hand-held terminal uses optimal location calculation. In this method, when CPU load of the hand-held terminal is increased, and requires additional Internet cost at the request for external ULID-to-location information conversion. However, the flow of the service is very simple.

The algorithm shown in FIG. 22 is a simplified version of an algorithm of the ULID processor of FIG. 16. Used are a step to resolve the ULID types 3 and 4 and the method of returning ULID as itself without performing optimal location calculation part.

Figure 23:
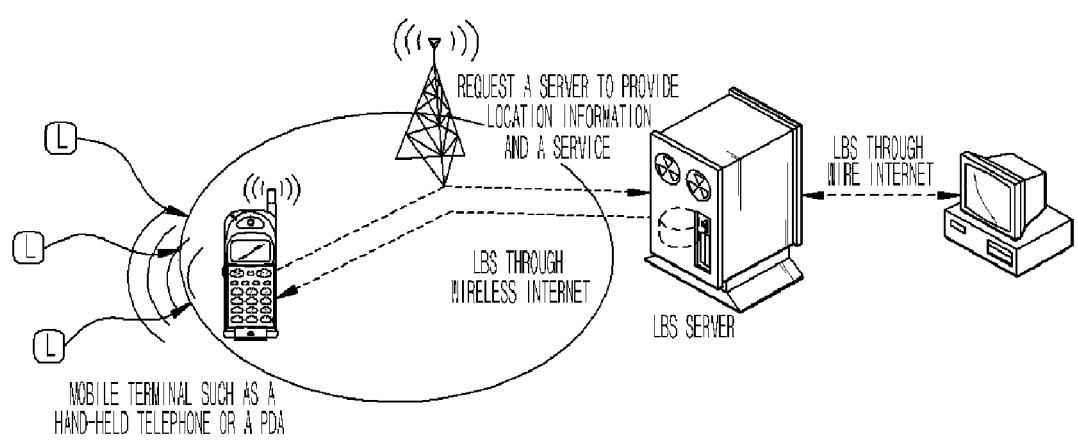
FIG. 23 illustrates an example of a service to which the present invention is applied.

FIG. 23 illustrates schematic architecture of a service in which the service method described above is used.

As described above, a ULID data structure, a ULID-based location acquisition method and an LBS system allow a user to easily use various LBS through RFID tags embedded in home appliances, road and buildings in ubiquitous environment. Since GPS is not used, the cost remains low.

The danger of leakage of private location information is reduced, which is caused by private information is processed by a server of a mobile communication company in LBS provided by the conventional mobile communication company.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A universal location identifier (ULID) code structure embodied in a computer-readable medium, comprising:
    a header having version information for identifying a type of ULID code;
    data blocks for identifying latitude, longitude and altitude; and
    a data block for identifying precision of unsigned integer type so as to identify precision of the latitude, longitude and altitude.

2. The ULID code structure of claim 1, further comprising:
    an authentication code data block for authenticating an organization or a person who records a ULID value.

3. The ULID code structure of claim 1, further comprising:
    an authentication code data block for authenticating an organization or a person who records a ULID value.

4. The ULID code structure of claim 1, wherein the ULID code is included in a serial number data block of an EPC-256 code.

5. The ULID code structure of claim 1, wherein the ULID code is included in a serial data block of an EPC-256 code.

6. A universal location identifier (ULID) code structure embodied in a computer-readable medium, comprising:
a header having version information for identifying a type of ULID code;
a DB/Mgt ID block for identifying a database including space objects;
a class ID block for identifying an object class or a table in the database; and
an object ID block for identifying an object class or a space object in the object class or the table.

7. The ULID code structure of claim 6, further comprising:
an offset value data block for identifying a specific location in a region of a corresponding space object.

8. The ULID code structure of claim 6, further comprising:
an authentication code data block for authenticating an organization or a person who records a ULID value.

9. The ULID code structure of claim 7, further comprising:
an authentication code data block for authenticating an organization or a person who records a ULID value.

10. The ULID code structure of claim 6, wherein the ULID code is included in a serial number data block of an EPC-256 code.

11. The ULID code structure of claim 7, wherein the ULID code is included in a serial number data block of an EPC-256 code.

12. A universal location identifier (ULID) based location acquisition method comprising:
(a) distributing RFID tags to a plurality of places and storing a ULID code for the corresponding place in each RFID tag;
(b) wirelessly receiving a plurality of ULID codes of the RFID tags though an RFID reader; and
(c) obtaining location information corresponding to each of the received ULID codes from a local ULID database and extracting current location information.

13. The method of claim 12, wherein, in the step (a), a ULID code structure, comprising a header having version information for identifying a type of each of the ULID codes and data blocks for identifying latitude, longitude and altitude, is used as the ULID code to be embedded into the RFID tag.

14. The method of claim 13, wherein, in the step (c), when the ULID code structure, comprising a header having version information for identifying a type of each of the ULID codes, a DB/Mgt ID block for identifying a database including space objects, a class ID block for identifying an object class or a table in the database, and an object ID block for identifying an object class or a space object in the object class or the table, is received, the extracting step comprises the steps of:
connecting to a ULID name service server;
obtaining an IP address of a corresponding ULID-to-location information conversion server or a ULID management server;
connecting to the corresponding ULID-to-location information conversion server or the ULID management server; and
confirming the location information on each of the received ULID codes.

15. The method of claim 14, wherein, in the step (c), when the plurality of ULID codes are received, the extracting step comprises the steps of:
(c-1) filtering the ULID codes by using threshold value of precision distance and auxiliary data of signal strength; and
(c-2) calculating location information of the filtered ULID codes and estimating an optimal current location.

16. The method of claim 13, wherein, in the step (c), when the plurality of ULID codes are received, the extracting step comprises the steps of:
(c-1) filtering the ULID codes by using threshold value of precision distance and auxiliary data of signal strength; and
(c-2) calculating location information of the filtered ULID codes and estimating an optimal current location.

17. The method of claim 12, wherein, in the step (a), a ULID code structure, comprising a header having version information for identifying a type of each of the ULID codes, a DB/Mgt ID block for identifying a database including space objects, a class ID block for identifying an object class or a table in the database and an object ID block for identifying an object class or a space object in the object class or the table, is used as the ULID code to be embedded into the RFID tag.

18. The method of claim 17, wherein, in the step (c), when the ULID code structure, comprising a header having version information for identifying a type of each of the ULID codes, a DB/Mgt ID block for identifying a database including space objects, a class ID block for identifying an object class or a table in the database, and an object ID block for identifying an object class or a space object in the object class or the table, is received, the extracting step comprises the steps of:
connecting to a ULID name service server;
obtaining an IP address of a corresponding ULID-to-location information conversion server or a ULID management server;
connecting to the corresponding ULID-to-location information conversion server or the ULID management server; and
confirming the location information on each of the received ULID codes.

19. The method of claim 18, wherein, in the step (c), when the plurality of ULID codes are received, the extracting step comprises the steps of:
(c-1) filtering the ULID codes by using threshold value of precision distance and auxiliary data of signal strength; and
(c-2) calculating location information of the filtered ULID codes and estimating an optimal current location.

20. The method of claim 17, wherein, in the step (c), when the plurality of ULID codes are received, the extracting step comprises the steps of:
(c-1) filtering the ULID codes by using threshold value of precision distance and auxiliary data of signal strength; and
(c-2) calculating location information of the filtered ULID codes and estimating an optimal current location.

21. The method of claim 12, wherein the step (b) comprises the step of:
obtaining auxiliary data including signal strength information in receiving the ULID code from the RFID tag.

22. The method of claim 21, wherein, in the step (c), when the plurality of ULID codes are received, the extracting step comprises the steps of:

(c-1) filtering the ULID codes by using threshold value of precision distance and auxiliary data of signal strength; and (c-2) calculating location information of the filtered ULID codes and estimating an optimal current location.

23. The method of claim 12, wherein, in the step (c), when the plurality of ULID codes are received, the extracting step comprises the steps of:
   (c-1) filtering the ULID codes by using threshold value of precision distance and auxiliary data of signal strength; and
   (c-2) calculating location information of the filtered ULID codes and estimating an optimal current location.

24. The method of claim 23, wherein the step (c-1) comprises the steps of:
   removing the ULID codes having precision distance larger than precision distance threshold value in the received ULID codes;
   determining effective signal traveling distance R through the auxiliary data of signal strength; and
   calculating each of distances between the RFID tag and other ULID codes in a ULID list, and removing a corresponding ULID code from the ULID list when all the calculated distances are larger than the effective signal traveling distance R, so that the final ULID list is returned as a filtered ULID list.

25. The method of claim 23, wherein the step (c-2) comprises the steps of:
   selecting the ULID codes having least precision distance among the received ULID codes;
   summing the precision distance m and signal traveling distance r of the RFID tag and defining the result as location precision distance; and
   extracting the current location information as location coordinates and the location precision distance.

26. The method of claim 25, wherein, when there are a plurality of ULID codes that have least precision distance, the step (c-2) comprises the steps of:
   if the signal strength s is available, extracting location coordinates and location precision distance of the ULID code whose signal strength is largest among the ULID codes having least precision distance as current location information; and
   if the signal strength s is not available, extracting location and location precision distance of the ULID code which is nearest to average location coordinates of the ULID codes having least precision distance as current location information.

27. The method of claim 12, wherein, in the step (c), when the plurality of ULID codes are received, the extracting step comprises the steps of:
   (c-1) filtering the ULID codes by using threshold value of precision distance and auxiliary data of signal strength; and
   (c-2) calculating location information of the filtered ULID codes and estimating an optimal current location.

28. A location based service (LBS) system using universal location identifier (ULID), comprising:
   a plurality of RFID tags distributed at various places, for wirelessly providing a ULID code of a location;
   an RFID reader for wirelessly receiving a plurality of ULID codes from near RFID tags;
   a local ULID processor for extracting current location information through wirelessly received ULID codes; and
   a local LBS software application for providing a user with an LBS on the basis of the extracted location information,
   wherein the RFID reader obtains signal strength information as auxiliary data in receiving the ULID code from each RFID tag.

29. The LBS system of claim 28, wherein the RFID tag stores a ULID code of a ULID code structure, comprising a header having version information for identifying a type of each of the ULID codes, and data blocks for identifying latitude, longitude and altitude.

30. The LBS system of claim 29, wherein, when the plurality of ULID codes are received, the local ULID processor filters the ULID codes by using threshold value of precision distance and auxiliary data of signal strength, calculates location information of the filtered ULID codes, and extracting optimal location information.

31. The LBS system of claim 28, wherein the RFID tag stores a ULID code of a ULID code structure, comprising a header having version information for identifying a type of each of the ULID codes, a DB/Mgt ID block for identifying a database including space objects, a class ID block for identifying an object class or a table in the database, and an object ID block for identifying an object class or a space object in the object class or the table.

32. The LBS system of claim 31, wherein, when the plurality of ULID codes are received, the local ULID processor filters the ULID codes by using threshold value of precision distance and auxiliary data of signal strength, calculates location information of the filtered ULID codes, and extracting optimal location information.

33. The LBS system of claim 28, further comprising: a local database having any one of a map information database, an LBS contents database and a ULID-to-location information conversion database.

34. The LBS system of claim 33, wherein the local ULID processor obtains location information corresponding to each of the received ULID codes from the local database and extracts culTent location information.

35. The LBS system of claim 34, wherein, when the plurality of ULID codes are received, the local ULID processor filters the ULID codes by using threshold value of precision distance and auxiliary data of signal strength, calculates location information of the filtered ULID codes and extracting optimal location information.

36. The LBS system of claim 33, further comprising: a ULID-to-location information conversion server for providing location information on a ULID code structure, comprising a header having version information for identifying a type of ULID code, a DB/Mgt ID block for identifying a database including space objects, a class ID block for identifying an object class or a table in the database, and an object ID block for identifying an object class or a space object in the object class or the table, though a network.

37. The LBS system of claim 36, wherein, when the plurality of ULID codes are received, the local ULID processor filters the ULID codes by using threshold value of precision distance and auxiliary data of signal strength, calculates location information of the filtered ULID codes and extracting optimal location information.

38. The LBS system of claim 33, wherein, when the local ULID processor receives the ULID code structure, comprising a header having version information for identifying a type of each of the ULID codes, a class DB/Mgt ID block for identifying a database including space objects, a class ID block for identifying an object class or a table in the database, and an object ID block for identifying object class or a space object in the object class or the table, the local ULID processor connects to the ULID name service server, obtains an IP address of a corresponding ULID-to-location information conversion server, connects to the corresponding ULID-to-location information conversion server, and confirms the location information on the received ULID codes.

39. The LBS system of claim 38, wherein, when the plurality of ULID codes are received, the local ULID processor filters the ULID codes by using threshold value of precision distance and auxiliary data of signal strength, calculates location information of the filtered ULID codes, and extracting optimal location information.

40. The LBS system of claim 33, wherein, when the plurality of ULID codes are received, the local ULID processor filters the ULID codes by using threshold value of precision distance and auxiliary data of signal strength, calculates location information of the filtered ULID codes, and extracting optimal location information.

41. The LBS system of claim 33, wherein, when the plurality of ULID codes are received, the local ULID processor filters the ULID codes by using threshold value of precision distance and auxiliary data of signal strength, calculates location information of the filtered ULID codes, and extracting optimal location information.

42. The LBS system of claim 28, further comprising:
an external LBS server for providing an external user with the LBS though wire and wireless Internet on the basis of acquired location information, and providing the corresponding LBS contents though wireless Internet at the request of the local LBS application.

43. The LBS system of claim 42, wherein, when the plurality of ULID codes are received, the local ULID processor filters the ULID codes by using threshold value of precision distance and auxiliary data of signal strength, calculates location information of the filtered ULID codes, and extracting optimal location information.

44. The LBS system of claim 42, wherein the LBS system provides a self-location informing service by the steps of:
transmitting the current location information acquired through the local ULID processor from the local LBS application to an external LBS server; and
informing an external user of the location though wire and wireless Internet on the basis of the location information at the external LBS server.

45. The LBS system of claim 42, wherein the LBS system provides a map searching service of current location by the steps of:
requesting the local ULID processor to provide location information at the local LBS application;
receiving the current location information from the local ULID processor at the local LBS application;
providing the external LBS server with the location information at the local LBS application;
receiving corresponding map contents from the external LBS server; and
providing a user with the map searching service at the local LBS application.

46. The LBS system of claim 42, wherein, when an external user requests the LBS system to provide location information, the LBS system provides the location information by the steps of:
requesting the local ULID processor to provide the location information at the external LBS server;
transmitting the ULID codes of RFID tags collected through an RFID reader and auxiliary data to the external LBS server at the local ULID processor; and
calculating optimal current location by using the ULID codes and the auxiliary data and providing the external user with a location information searching service regarding a terminal user at the external LBS server.

47. The LBS system of claim 46, wherein the local ULID processor transmits the ULID codes by the steps of:
filtering the ULID codes; and transmitting the filtered ULID codes and auxiliary data to the external LBS server.

48. The LBS system of claim 28, wherein, when the plurality of ULID codes are received, the local ULID processor filters the ULID codes by using threshold value of precision distance and auxiliary data of signal strength, calculates location information of the filtered ULID codes and extracting optimal location information.

49. The LBS system of claim 48, wherein the local ULID processor filters the received ULID codes by the steps of:
removing the ULID codes that have precision distance larger than precision distance threshold value in the received ULID codes;
determining effective signal traveling distance R of the RFID tags though the auxiliary data of signal strength; and
calculating each of distances between the RFID tags and other ULID codes in a ULID list, and removing a corresponding ULID code from the ULID list when all the calculated distances are larger than the effective signal traveling distance R, so that the final ULID list is returned as a filtered ULID list.

50. The LBS system of claim 48, wherein the local ULID processor extracts the optimal location information by the steps of:
selecting the ULID code having least precision distance among the received ULID codes;
summing the precision distance m and signal traveling distance r of the RFID tags and defining the result as location precision distance; and
extracting the current location information as location coordinates and the location precision distance.

51. The LBS system of claim 50, wherein, when there are a plurality of ULID codes that have least precision distance, the local ULID processor extracts the optimal location information by the steps of:
if the signal strength s is available, extracting location coordinates and location precision distance of the ULID code whose signal strength is largest among the ULID codes having least precision distance as current location information; and
if the signal strength s is not available, extracting location coordinates and location precision distance of the ULID code which is nearest to average location coordinates of the ULID codes having least precision distance as current location information.

52. The LBS system of claim 28, wherein, when the plurality of ULID codes are received, the local ULID processor filters the ULID codes by using threshold value of precision distance and auxiliary data of signal strength, calculates location information of the filtered ULID codes and extracting optimal location information.

* * * * *